US011921454B2

(12) United States Patent
Burkatovsky

(10) Patent No.: US 11,921,454 B2
(45) Date of Patent: Mar. 5, 2024

(54) CONTROLLING AND MONITORING A DIGITAL PRINTING SYSTEM BY INSPECTING A PERIODIC PATTERN OF A FLEXIBLE SUBSTRATE

(71) Applicant: Landa Corporation Ltd., Rehovot (IL)

(72) Inventor: Vitaly Burkatovsky, Rishon Lezion (IL)

(73) Assignee: LANDA CORPORATION LTD., Rehovot (IL)

( * ) Notice: Subject to any disclaimer, the term of this patent is extended or adjusted under 35 U.S.C. 154(b) by 95 days.

(21) Appl. No.: 17/636,906

(22) PCT Filed: Sep. 2, 2020

(86) PCT No.: PCT/IB2020/058156
§ 371 (c)(1),
(2) Date: Feb. 21, 2022

(87) PCT Pub. No.: WO2021/044303
PCT Pub. Date: Mar. 11, 2021

(65) Prior Publication Data

US 2022/0357699 A1 Nov. 10, 2022

Related U.S. Application Data

(60) Provisional application No. 62/896,013, filed on Sep. 5, 2019.

(51) Int. Cl.

| | |
|---|---|
| ***G03G 15/00*** | (2006.01) |
| ***B41J 2/005*** | (2006.01) |
| ***G03G 15/16*** | (2006.01) |

(52) U.S. Cl.
CPC ........ *G03G 15/6591* (2013.01); *B41J 2/0057* (2013.01); *G03G 15/162* (2013.01);
(Continued)

(58) Field of Classification Search
CPC ............. G03G 15/162; G03G 15/5029; G03G 15/5054; G03G 15/6591; G03G 2215/00527; B41J 2/0057
See application file for complete search history.

(56) References Cited

U.S. PATENT DOCUMENTS

| | | | |
|---|---|---|---|
| 6,151,040 | A | 11/2000 | Takada et al. |
| 7,313,352 | B2 | 12/2007 | Shinohara et al. |

(Continued)

FOREIGN PATENT DOCUMENTS

| | | | |
|---|---|---|---|
| JP | H05212851 | A | 8/1993 |
| JP | 2008248437 | A | 10/2008 |

(Continued)

OTHER PUBLICATIONS

Osram Opto Semiconductors GmbH, "SFH 206 K—Radial Sidelooker—Silicon PIN Photodiode", Datasheet, Version 1.4, pp. 1-14, Jan. 7, 2020.

(Continued)

*Primary Examiner* — Joseph S Wong
(74) *Attorney, Agent, or Firm* — Kligler & Associates Patent Attorneys Ltd.

(57) ABSTRACT

A digital printing system (10) includes a flexible substrate (44), an optical assembly (200, 301) and a processor (20). The flexible substrate (44) has a periodic pattern, and is configured to be moved and to receive ink droplets in a printing process that forms an image thereon. The optical assembly (200, 301) is configured to illuminate the flexible substrate (44) with light (215, 315), to detect the light (215, 315) from the flexible substrate (44), and to derive from the detected light (215, 315) a signal indicative of the periodic pattern. The processor (20) is configured to receive the signal and to monitor or control the digital printing system (10) based on the periodic pattern as indicated by the signal.

18 Claims, 6 Drawing Sheets

(52) U.S. Cl.
CPC ..... *G03G 15/5029* (2013.01); *G03G 15/5054* (2013.01); *G03G 2215/00527* (2013.01)

(56) References Cited

U.S. PATENT DOCUMENTS

| | | | |
|---|---|---|---|
| 7,583,920 B2 | 9/2009 | Willemsens et al. | |
| 9,186,884 B2 | 11/2015 | Landa et al. | |
| 9,229,664 B2 | 1/2016 | Landa et al. | |
| 9,327,496 B2 | 5/2016 | Landa et al. | |
| 9,914,316 B2 | 3/2018 | Landa et al. | |
| 2006/0127617 A1* | 6/2006 | Tanaka ................. | G03G 15/162 428/141 |
| 2015/0054865 A1 | 2/2015 | Landa et al. | |
| 2015/0118503 A1 | 4/2015 | Landa et al. | |
| 2016/0075130 A1 | 3/2016 | Landa et al. | |
| 2017/0008272 A1 | 1/2017 | Landa et al. | |
| 2017/0275113 A1* | 9/2017 | Rietbergen ............... | B65H 7/14 |
| 2018/0178550 A1 | 6/2018 | Kremers et al. | |
| 2018/0335740 A1* | 11/2018 | Kishi ................. | G03G 15/0415 |
| 2019/0152218 A1 | 5/2019 | Landa et al. | |

FOREIGN PATENT DOCUMENTS

| | | |
|---|---|---|
| JP | 2018150660 A | 9/2018 |
| WO | 2013132424 A1 | 9/2013 |
| WO | 2013132424 A9 | 9/2013 |
| WO | 2013132438 A2 | 9/2013 |
| WO | 2017208144 A1 | 12/2017 |
| WO | 2017208152 A1 | 12/2017 |
| WO | 2017208155 A1 | 12/2017 |
| WO | 2019012456 A1 | 1/2019 |
| WO | 2020003088 A1 | 1/2020 |
| WO | 2020035766 A1 | 2/2020 |

OTHER PUBLICATIONS

Vishay Intertechnology, Inc., "Power SMD LED LCC-2 Plus", Datasheet, pp. 1-9, year 2017.

Siemens Semiconductor Group, "Silizium-PIN-Fotodiode—SFH 206 K,", Datasheet, pp. 1-4, Mar. 17, 1998.

International Application # PCT/IB2020/058156 Search Report dated Jan. 11, 2021.

Co-pending U.S. Appl. No. 18/207,180, inventor Landa; Benzion, filed Jun. 8, 2023.

JP2008248437A Machine Translation (by EPO and Google)—published Oct. 16, 2008; Seiren Co Ltd.

JP2018150660A Machine Translation (by EPO and Google)—published Sep. 27, 2018; Seiren Co Ltd.

JPH05212851A Machine Translation (by EPO and Google)—published Aug. 24, 1993; Kanebo Ltd et al.

* cited by examiner

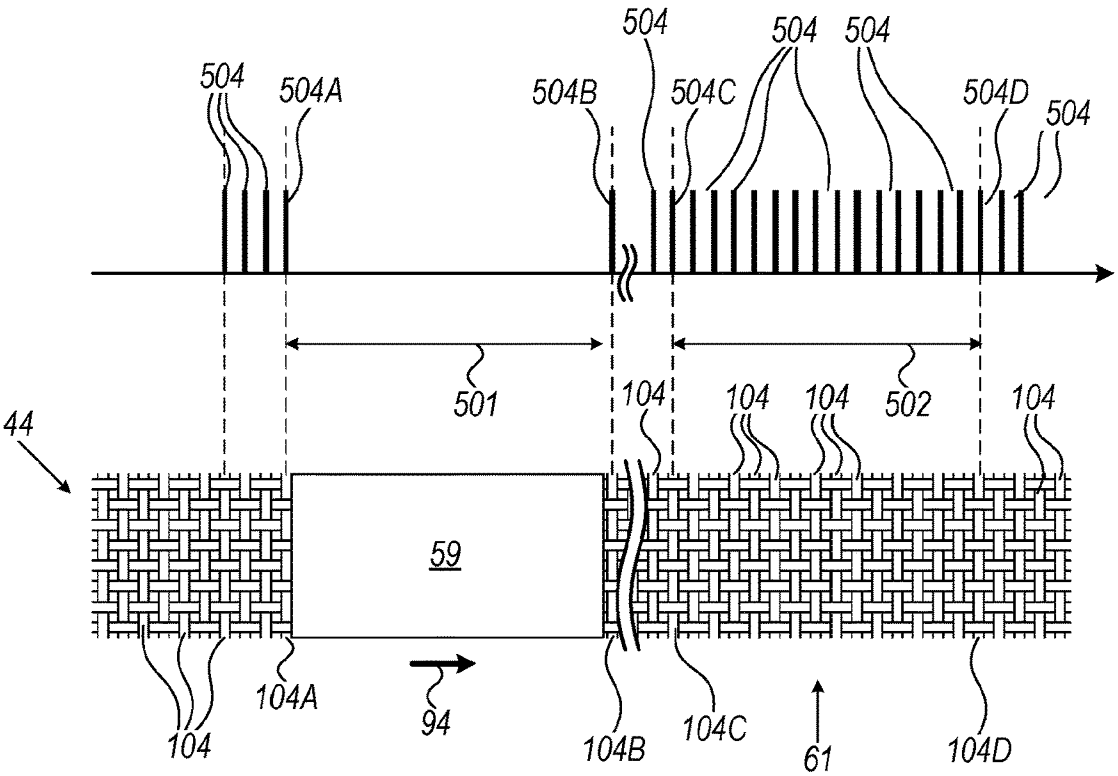
FIG. 6
FIG. 7
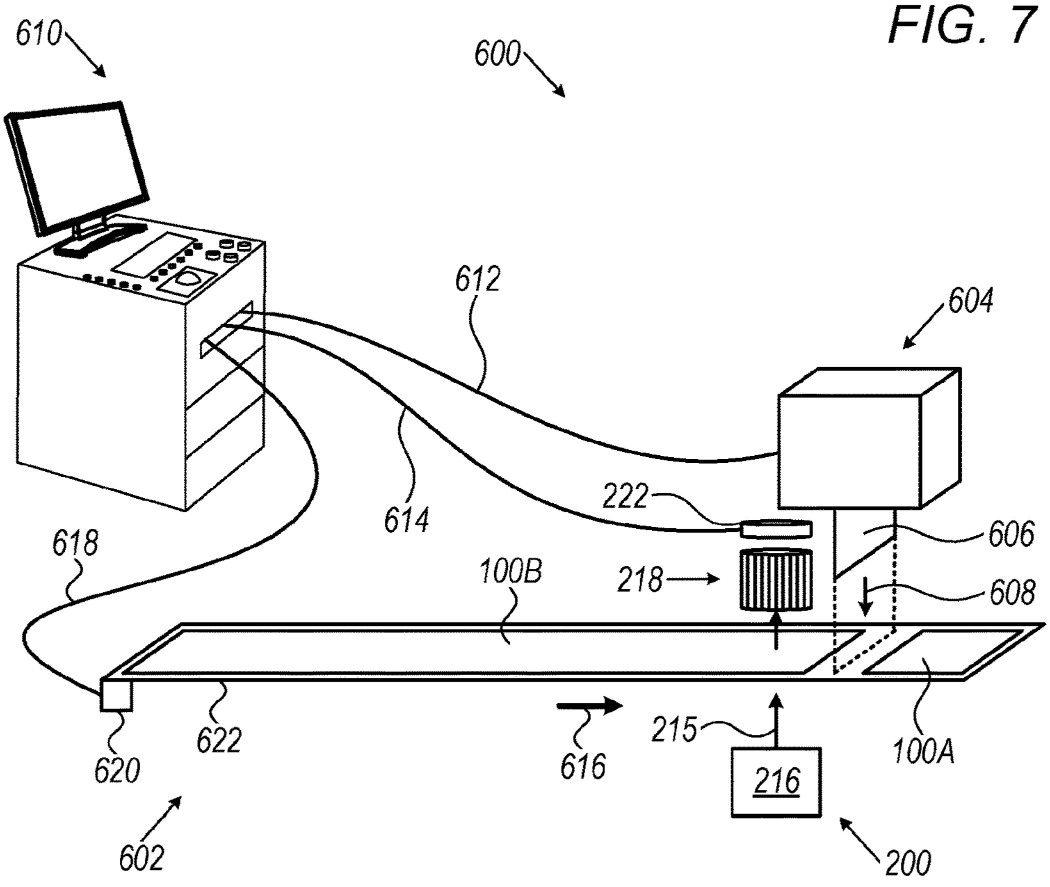

CONTROLLING AND MONITORING A DIGITAL PRINTING SYSTEM BY INSPECTING A PERIODIC PATTERN OF A FLEXIBLE SUBSTRATE

CROSS-REFERENCE TO RELATED APPLICATIONS

This application is U.S. National Phase of PCT Application PCT/IB2020/058156, filed Sep. 2, 2020, which claims the benefit of U.S. Provisional Patent Application 62/896, 013, filed Sep. 5, 2019. The disclosures of these related applications are incorporated herein by reference.

FIELD OF THE INVENTION

The present invention relates generally to digital printing, and particularly to methods and systems for controlling and monitoring the operation and calibration of digital printing systems.

BACKGROUND OF THE INVENTION

Various methods and devices for controlling processes in digital printing are known in the art.

For example, PCT Patent Application PCT/IB2013/051727 describes control apparatus and methods for a printing system, for example, comprising an intermediate transfer member (ITM). Some embodiments relate to regulation of a velocity and/or tension and/or length of the ITM. Some embodiments relate to regulation of deposition of ink on the moving ITM. Some embodiments regulate to apparatus configured to alert a user of one or more events related to operation of the ITM.

PCT Patent Application PCT/IB2019/055288 describes an intermediate transfer member (ITM) configured for receiving ink droplets to form an ink image thereon and for transferring the ink image to a target substrate, the ITM includes one or more layers and one or more markers integrated with at least one of the one or more layers at one or more respective marking locations along the ITM.

SUMMARY OF THE INVENTION

An embodiment of the present invention that is described herein provides a digital printing system including a flexible substrate, an optical assembly and a processor. The flexible substrate has a periodic pattern, and is configured to be moved and to receive ink droplets in a printing process that forms an image thereon. The optical assembly is configured to illuminate the flexible substrate with light, to detect the light from the flexible substrate, and to derive from the detected light a signal indicative of the periodic pattern. The processor is configured to receive the signal and to monitor or control the digital printing system based on the periodic pattern as indicated by the signal.

In some embodiments, the flexible substrate includes a flexible intermediate transfer member (ITM), which is configured to receive the ink droplets and to transfer the image to a target substrate. In other embodiments, the flexible substrate includes a fabric. In yet other embodiments, the fabric includes first and second sets of fibers interleaved with one another in accordance with the periodic pattern, and the optical assembly is configured to derive the signal indicative of the periodic pattern from the interleaved first and second sets of fibers.

In an embodiment, the first and second sets of fibers are laid out orthogonally to one another in accordance with the periodic pattern, and the optical assembly is configured to derive the signal indicative of the periodic pattern from the orthogonal layout of the first and second sets of fibers. In another embodiment, the first set of fibers is laid out orthogonally to a movement axis of the flexible substrate in accordance with the periodic pattern, and the optical assembly is configured to derive the signal indicative of the periodic pattern from the first set of fibers. In yet another embodiment, the fabric includes the periodic pattern, the optical assembly is configured to detect multiple position reference points in the periodic pattern of the fabric, and the processor is configured to calculate a position of the flexible substrate based on at least one of the position reference points.

In some embodiments, the signal is indicative of a position of at least one of the position reference points, and the processor is configured to control the digital printing system based on one or more of the position reference points. In other embodiments, the system includes an image forming station, which is configured to direct a first ink droplet to a first ink position on the flexible substrate and a second ink droplet to a second ink position on the flexible substrate, the signal includes a first signal indicative of the first ink position and a second signal indicative of the second ink position, and the processor is configured to control a registration between the first and second ink positions based on the first and second signals. In yet other embodiments, the first ink droplet includes a first color and the second ink droplet includes a second color, different from the first color, and the processor is configured to control a color-to-color registration based on the first and second signals.

In an embodiment, the signal includes a first signal derived at a first time and a second signal derived at a second time, different from the first time, and the processor is configured to monitor one or more parameters of the flexible substrate based on the first and second signals. In another embodiment, the processor is configured to schedule a replacement of the flexible substrate based on the first and second signals. In yet another embodiment, the processor is configured to monitor a stretching of the flexible substrate based on at least one of the first and second signals.

In some embodiments, the processor is configured to adjust a moving speed of the flexible substrate based on at least one of the first and second signals. In other embodiments, the processor is configured to adjust a tension applied to the flexible substrate based on at least one of the first and second signals. In yet other embodiments, the flexible substrate has an opacity that varies in accordance with the periodic pattern.

In an embodiment, the processor is configured to control the printing process based on the periodic pattern as indicated by the signal. In another embodiment, the flexible substrate includes a flexible intermediate transfer member (ITM), which is configured, after receiving the image, to transfer the image to a target substrate, and the processor is configured, based on the signal, to adjust or abort the transfer of the image. In yet another embodiment, the processor is configured to calibrate at least one assembly of the digital printing system based on the signal.

In some embodiments, the flexible substrate includes (i) the fabric having the periodic pattern and a first elongation obtained when applying a given tension to the moving flexible substrate, and (ii) a seam for coupling between edges of the fabric, the seam has a structure other than the periodic pattern, so that when applying the given tension to the moving flexible substrate, the seam has a second elongation different from the first elongation, and the processor is configured, based on the signal, to calculate a ratio between the first and second elongations. In other embodiments, the processor is configured to control the digital printing system based on the calculated ratio between the first and second elongations. In yet other embodiments, the flexible substrate includes a continuous loop configured to be moved, within the digital printing system, in at least first and second revolutions, and the processor is configured to calculate at least: (i) a first ratio, between the first and second elongations, per the first revolution, and (ii) a second ratio, between the first and second elongations, per the second revolution, and the processor is configured to monitor or control the digital printing system based on at least the first ratio and the second ratio.

In an embodiment, the optical assembly includes at least a first sensing assembly configured to derive a first periodic signal, and a second position sensing assembly configured to derive a second periodic signal, the first and second position assemblies are disposed at first and second respective positions across the flexible substrate, and the processor is configured, based on the first and second periodic signals, to detect a distortion occurred in the flexible substrate. In another embodiment, the first and second position assemblies are disposed along an axis orthogonal to a moving direction of the flexible substrate. In yet another embodiment, at least one of the first and second position assemblies is disposed adjacent to an edge of the flexible substrate.

In some embodiments, the periodic pattern of the flexible substrate serves as an encoder scale of a motion encoder. In other embodiments, the flexible substrate and the optical assembly together serve as the motion encoder.

There is additionally provided, in accordance with an embodiment of the present invention, a method for controlling a digital printing system, the method including illuminating with light a movable flexible substrate having a periodic pattern, and the flexible substrate receives ink droplets in a printing process that forms an image thereon. The light from the flexible substrate is detected and a signal indicative of the periodic pattern is derived from the detected light. The digital printing system is monitored or controlled based on the periodic pattern as indicated by the signal.

There is further provided, in accordance with an embodiment of the present invention, a system for producing a flexible substrate having a periodic pattern, the system includes a motion assembly, an optical assembly, a cutting subsystem, and a processor. The motion assembly is configured to move the flexible substrate along a moving direction. The optical assembly is configured to illuminate the flexible substrate with light, to detect the light from the flexible substrate and to derive from the detected light a signal indicative of the periodic pattern. The cutting subsystem is configured to cut the flexible substrate. The processor is configured to receive the signal from the optical assembly, and based on the signal, to determine a cutting position at which to cut the flexible substrate, and to control the cutting subsystem to cut the flexible substrate at the position.

In some embodiments, the periodic pattern includes a plurality of repeating pattern units, the signal includes a plurality of pulses indicative of respective pattern units detected by the optical assembly, and the processor is configured to count a number of pulses in the signal, and to determine the cutting position in response to detecting that the number of pulses exceeds a preassigned value. In other embodiments, the processor is configured to control the motion assembly to move the flexible substrate at a first speed at a first time interval during which the processor counts the pulses and at a second speed at a second time interval during which the processor controls the cutting subsystem to cut the flexible substrate. In yet other embodiments, the flexible substrate includes a fabric having first and second sets of fibers interleaved with one another in accordance with the periodic pattern, and the optical assembly is configured to derive the signal indicative of the periodic pattern from light detected from the interleaved first and second sets of fibers.

In an embodiment, the first and second sets of fibers are laid out orthogonally to one another in accordance with the periodic pattern, and the optical assembly is configured to derive the signal indicative of the periodic pattern from light detected from the orthogonal layout of the first and second sets of fibers. In another embodiment, the first set of fibers is laid out orthogonally to the moving direction of the flexible substrate in accordance with the periodic pattern, and the optical assembly is configured to derive the signal indicative of the periodic pattern from light detected from the first set of fibers.

There is additionally provided, in accordance with an embodiment of the present invention, a method for producing a flexible substrate having a periodic pattern, the method includes moving the flexible substrate, along a moving direction, over a production surface. The flexible substrate is illuminated with light, the light is detected from the flexible substrate, and a signal indicative of the periodic pattern, is derived from the detected light. Based on the signal, a cutting position at which to cut the flexible substrate is determined, and the flexible substrate is cut at the cutting position.

The present invention will be more fully understood from the following detailed description of the embodiments thereof, taken together with the drawings in which:

BRIEF DESCRIPTION OF THE DRAWINGS

FIG. 6 is a block diagram that schematically illustrates a method for estimating relative elongation between a seam and a fabric section of a blanket, using fiber events received from a position sensing assembly, in accordance with an embodiment of the present invention;

FIG. 7 is a schematic, pictorial illustration of a system for cutting a blanket fabric during production of a blanket, in accordance with an embodiment of the present invention.

DETAILED DESCRIPTION OF EMBODIMENTS

Overview

Figure 1:
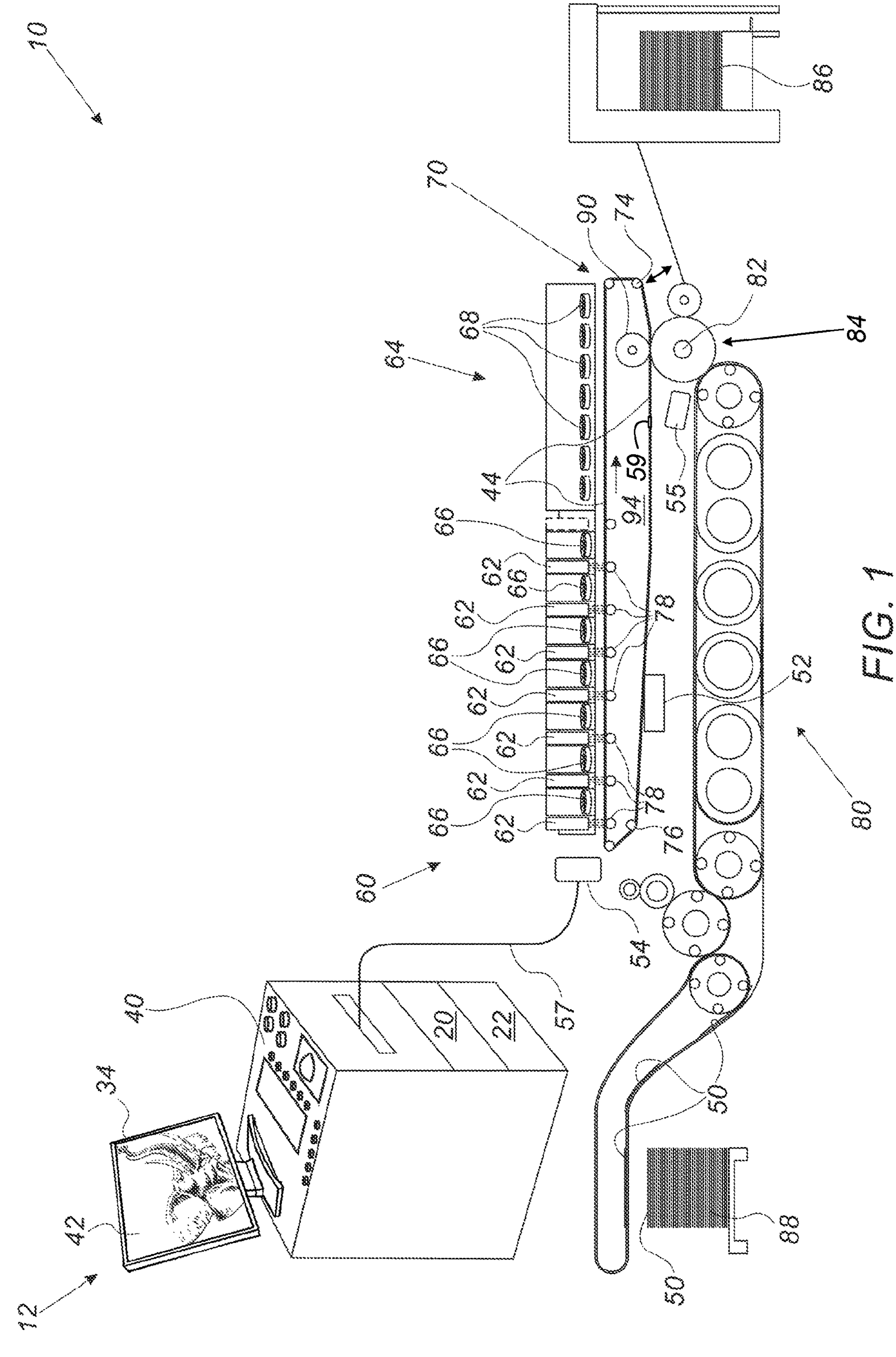
FIG. 1 is a schematic side view of a digital printing system, in accordance with an embodiment of the present invention.

Embodiments of the present invention that are described hereinbelow provide methods and system for controlling a printing process carried out in a digital printing system. In some embodiments, the printing process comprises moving a flexible intermediate transfer member (ITM), also referred to herein as a blanket, which is configured to receive ink droplets that form an image thereon. Subsequently the image is transferred from the blanket to a target substrate, such as a sheet or continuous web.

In order to control the printing process, a processor of the system, also referred to herein as a printing controller, receives control data, such as a position of the blanket relative to a reference point. In principle, it is possible to dispose markers on the blanket, and mount on the printing system a signal acquisition apparatus, which is configured to provide a signal indicative of the position of one of the markers traversing the signal acquisition apparatus. However, at least some of the markers (a) may differ from one another, e.g., due to variations in the marker formation process, and/or (b) may be obscured by defects formed in the blanket. Moreover, the number of markers disposed on the blanket is limited by various parameters, such as marker size and distance between adjacent markers, which affects the frequency and/or quality of the marker measurement.

In some embodiments, the blanket comprises a fabric made from two or more sets of fibers interleaved with one another. The fabric has an opacity that varies in accordance with a periodic pattern of the interleaved fibers.

In some embodiments, the digital printing system comprises an optical assembly having a light source at one side of the blanket, and a light detector at the other side of the blanket. The optical assembly is configured to illuminate the blanket with light, to detect the light passing through the fabric, and to derive from the detected light one or more position signals indicative of one or more respective position reference points (e.g., fibers) in the periodic pattern of the fabric.

In some embodiments, based on the signals, the processor of the digital printing system is configured to control the printing process and to monitor the condition of various elements of the system, such as, the blanket, which is replaceable. For example, based on the signals, the processor may adjust the moving speed of the blanket and/or the jetting time/sequence of the ink droplets so as to compensate for distortion of the blanket during the printing process, for example so as to improve the registration between different ink images made from different colors of ink. Moreover, based on the signals, the processor may detect overstretching or under-stretching of the blanket, and in response, may adjust the tension applied to the blanket by the printing system. In some embodiments, the processor may hold a threshold, and may schedule a blanket replacement in case the overstretching exceeds the threshold.

The disclosed techniques improve the quality of digitally printed images by reducing image distortions caused during the printing process, for example, by registration errors. Moreover, the disclosed techniques reduce the manufacturing costs by eliminating the need to produce position markers on the ITM or on any flexible continuous substrate configured to receive ink droplets that form an image thereon, and/or by increasing the reliability of the system by the ability to closely follow the blanket movement and condition.

System Description

FIG. 1 is a schematic side view of a digital printing system 10, in accordance with an embodiment of the present invention. In some embodiments, system 10 comprises a rolling flexible blanket 44 that cycles through an image forming station 60, a drying station 64, an impression station 84 and a blanket treatment station 52. In the context of the present invention and in the claims, the terms “blanket” and “intermediate transfer member (ITM)” are used interchangeably and refer to a flexible member comprising one or more layers used as an intermediate member configured to receive an ink image and to transfer the ink image to a target substrate, as will be described in detail below.

In an operative mode, image forming station 60 is configured to form a mirror ink image, also referred to herein as “an ink image” (not shown) or as an “image” for brevity, of a digital image 42 on an upper run of a surface of blanket 44. Subsequently the ink image is transferred to a target substrate, (e.g., a paper, a folding carton, a multilayered polymer, or any suitable flexible package in a form of sheets or continuous web) located under a lower run of blanket 44.

In the context of the present invention, the term “run” refers to a length or segment of blanket 44 between any two given rollers over which blanket 44 is guided.

In some embodiments, during installation blanket 44 may be adhered edge to edge in a region referred to herein as a seam 59, so as to form a continuous blanket loop (not shown). In some embodiments, seam 59 may have a structure, and therefore, mechanical properties different from that of a fabric of blanket 44. The structure difference is described in FIGS. 2A and 2B below, and embodiments related to the difference of mechanical properties is described in detail in FIG. 6 below. An example of a method and a system for the installation of the seam is described in detail in PCT International Publication WO 2019/012456, whose disclosure is incorporated herein by reference.

In some embodiments, image forming station 60 typically comprises multiple print bars 62, each mounted (e.g., using a slider) on a frame (not shown) positioned at a fixed height above the surface of the upper run of blanket 44. In some embodiments, each print bar 62 comprises a strip of print heads as wide as the printing area on blanket 44 and comprises individually controllable print nozzles.

In some embodiments, image forming station 60 may comprise any suitable number of bars 62, each bar 62 may contain a printing fluid, such as an aqueous ink of a different color. The ink typically has visible colors, such as but not limited to cyan, magenta, red, green, blue, yellow, black and white. In the example of FIG. 1, image forming station 60 comprises seven print bars 62, but may comprise, for example, four print bars 62 having any selected colors such as cyan, magenta, yellow and black.

In some embodiments, the print heads are configured to jet ink droplets of the different colors onto the surface of blanket 44 so as to form the ink image (not shown) on the surface of blanket 44.

In some embodiments, different print bars 62 are spaced from one another along the movement axis, also referred to herein as moving direction of blanket 44, represented by an arrow 94. In this configuration, accurate spacing between bars 62, and synchronization between directing the droplets of the ink of each bar 62 and moving blanket 44 are essential for enabling correct placement of the image pattern.

In some embodiments, system 10 comprises heaters, such as hot gas or air blowers 66 and/or infrared (IR) heaters or and other suitable type of heaters adapted for the printing application. In the example of FIG. 1, air blowers 66 are positioned in between print bars 62, and are configured to partially dry the ink droplets deposited on the surface of blanket 44. This hot air flow between the print bars may assist, for example, in reducing condensation at the surface of the print heads and/or in handling satellites (e.g., residues or small droplets distributed around the main ink droplet), and/or in preventing blockage of the inkjet nozzles of the print heads, and/or in preventing the droplets of different color inks on blanket 44 from undesirably merging into one another. In some embodiments, system 10 comprises drying station 64, configured to blow hot air (or another gas) onto the surface of blanket 44. In some embodiments, drying station comprises air blowers 68 or any other suitable drying apparatus.

In drying station 64, the ink image formed on blanket 44 is exposed to radiation and/or to hot air in order to dry the ink more thoroughly, evaporating most or all of the liquid carrier and leaving behind only a layer of resin and coloring agent which is heated to the point of being rendered tacky ink film.

In some embodiments, system 10 comprises a blanket module 70 comprising a rolling ITM, such as a blanket 44. In some embodiments, blanket module 70 comprises one or more rollers 78, wherein at least one of rollers 78 comprises an encoder (not shown), which is configured to record the position of blanket 44, so as to control the position of a section of blanket 44 relative to a respective print bar 62. In some embodiments, the encoder of roller 78 typically comprises a rotary encoder configured to produce rotary-based position signals indicative of an angular displacement of the respective roller. Note that in the context of the present invention and in the claims, the terms "indicative of" and "indication" are used interchangeably.

Additionally or alternatively, blanket 44 may comprise an integrated encoder (not shown) for controlling the operation of various modules of system 10. One implementation of the integrated encoder is described in detail, for example, in U.S. Provisional Application 62/689,852, whose disclosure is incorporated herein by reference.

In some embodiments, blanket 44 is guided over rollers 76 and 78 and a powered tensioning roller, also referred to herein as a dancer assembly 74. Dancer assembly 74 is configured to control the length of slack in blanket 44 and its movement is schematically represented by a double sided arrow. Furthermore, any stretching of blanket 44 with aging would not affect the ink image placement performance of system 10 and would merely require the taking up of more slack by tensioning dancer assembly 74.

In some embodiments, dancer assembly 74 may be motorized. The configuration and operation of rollers 76 and 78 are described in further detail, for example, in U.S. Patent Application Publication 2017/0008272 and in the above-mentioned PCT International Publication WO 2013/132424, whose disclosures are all incorporated herein by reference.

In some embodiments, system 10 may comprise one or more tension sensors (not shown) disposed at one or more positions along blanket 44. The tension sensors may be integrated in blanket 44 or may comprise sensors external to blanket 44 using any other suitable technique to acquire signals indicative of the mechanical tension applied to blanket 44. In some embodiments, processor 20 and additional controllers of system 10 (shown, for example, in FIGS. 2 and 3 below) are configured to receive the signals produce by the tension sensors, so as to monitor the tension applied to blanket 44 and to control the operation of dancer assembly 74.

In impression station 84, blanket 44 passes between an impression cylinder 82 and a pressure cylinder 90, which is configured to carry a compressible blanket.

In some embodiments, system 10 comprises a control console 12, which is configured to control multiple modules of system 10, such as blanket module 70, image forming station 60 located above blanket module 70, and a substrate transport module 80, which is located below blanket module 70 and comprises one or more impression stations as will be described below.

In some embodiments, console 12 comprises a processor 20, typically a general-purpose computer, with suitable front end and interface circuits for interfacing with controllers of dancer assembly 74 and with a controller 54, via a cable 57, and for receiving signals therefrom. In some embodiments, controller 54, which is schematically shown as a single device, may comprise one or more electronic modules mounted on system 10 at predefined locations. At least one of the electronic modules of controller 54 may comprise an electronic device, such as control circuitry or a processor (not shown), which is configured to control various modules and stations of system 10. In some embodiments, processor 20 and the control circuitry may be programmed in software to carry out the functions that are used by the printing system, and store data for the software in a memory 22. The software may be downloaded to processor 20 and to the control circuitry in electronic form, over a network, for example, or it may be provided on non-transitory tangible media, such as optical, magnetic or electronic memory media.

In some embodiments, console 12 comprises a display 34, which is configured to display data and images received from processor 20, or inputs inserted by a user (not shown) using input devices 40. In some embodiments, console 12 may have any other suitable configuration, for example, an alternative configuration of console 12 and display 34 is described in detail in U.S. Pat. No. 9,229,664, whose disclosure is incorporated herein by reference.

In some embodiments, processor 20 is configured to display on display 34, a digital image 42 comprising one or more segments (not shown) of image 42 and/or various types of test patterns that may be stored in memory 22.

In some embodiments, blanket treatment station 52, also referred to herein as a cooling station, is configured to treat the blanket by, for example, cooling it and/or applying a treatment fluid to the outer surface of blanket 44, and/or cleaning the outer surface of blanket 44. At blanket treatment station 52, the temperature of blanket 44 can be reduced to a desired value before blanket 44 enters image forming station 60. The treatment may be carried out by passing blanket 44 over one or more rollers or blades configured for applying cooling and/or cleaning and/or treatment fluid on the outer surface of the blanket.

In some embodiments, blanket treatment station 52 may be positioned adjacent to image forming station 60, in addition to or instead of the position of blanket treatment station 52 shown in FIG. 1. In such embodiments, the blanket treatment station may comprise one or more bars, adjacent to print bars 62, and the treatment fluid is applied to blanket 44 by jetting.

In some embodiments, processor 20 is configured to receive, e.g., from temperature sensors (not shown), signals indicative of the surface temperature of blanket 44, so as to monitor the temperature of blanket 44 and to control the operation of blanket treatment station 52. Examples of such treatment stations are described, for example, in PCT International Publications WO 2013/132424 and WO 2017/208152, whose disclosures are all incorporated herein by reference.

Additionally or alternatively, treatment fluid may be applied to blanket 44, by jetting, prior to the ink jetting at the image forming station.

In the example of FIG. 1, station 52 is mounted between impression station 84 and image forming station 60, yet, station 52 may be mounted adjacent to blanket 44 at any other or additional one or more suitable locations between impression station 84 and image forming station 60. As described above, station 52 may additionally or alternatively comprise on a bar adjacent to image forming station 60.

In the example of FIG. 1, impression cylinder 82 impresses the ink image onto the target flexible substrate, such as an individual sheet 50, conveyed by substrate transport module 80 from an input stack 86 to an output stack 88 via impression cylinder 82.

In some embodiments, the lower run of blanket 44 selectively interacts at impression station 84 with impression cylinder 82 to impress the image pattern onto the target flexible substrate compressed between blanket 44 and impression cylinder 82 by the action of pressure of pressure cylinder 90. In the case of a simplex printer (i.e., printing on one side of sheet 50) shown in FIG. 1, only one impression station 84 is needed.

In other embodiments, module 80 may comprise two or more impression cylinders so as to permit one or more duplex printing. The configuration of two impression cylinders also enables conducting single sided prints at twice the speed of printing double sided prints. In addition, mixed lots of single and double sided prints can also be printed. In alternative embodiments, a different configuration of module 80 may be used for printing on a continuous web substrate. Detailed descriptions and various configurations of duplex printing systems and of systems for printing on continuous web substrates are provided, for example, in U.S. Pat. Nos. 9,914,316 and 9,186,884, in PCT International Publication WO 2013/132424, in U.S. Patent Application Publication 2015/0054865, and in U.S. Provisional Application 62/596,926, whose disclosures are all incorporated herein by reference.

As briefly described above, sheets 50 or continuous web substrate (not shown) are carried by module 80 from input stack 86 and pass through the nip (not shown) located between impression cylinder 82 and pressure cylinder 90. Within the nip, the surface of blanket 44 carrying the ink image is pressed firmly, e.g., by compressible blanket (not shown), of pressure cylinder 90 against sheet 50 (or other suitable substrate) so that the ink image is impressed onto the surface of sheet 50 and separated neatly from the surface of blanket 44. Subsequently, sheet 50 is transported to output stack 88.

In the example of FIG. 1, rollers 78 are positioned at the upper run of blanket 44 and are configured to maintain blanket 44 taut when passing adjacent to image forming station 60. Furthermore, it is particularly important to control the speed of blanket 44 below image forming station 60 so as to obtain accurate jetting and deposition of the ink droplets, thereby placement of the ink image, by image forming station 60, on the surface of blanket 44.

In some embodiments, impression cylinder 82 is periodically engaged to and disengaged from blanket 44 to transfer the ink images from moving blanket 44 to the target substrate passing between blanket 44 and impression cylinder 82. In some embodiments, system 10 is configured to apply torque to blanket 44 using the aforementioned rollers and dancer assemblies, so as to maintain the upper run taut and to substantially isolate the upper run of blanket 44 from being affected by mechanical vibrations occurring in the lower run.

In some embodiments, system 10 comprises an image quality control station 55, also referred to herein as an automatic quality management (AQM) system, which serves as a closed loop inspection system integrated in system 10. In some embodiments, station 55 may be positioned adjacent to impression cylinder 82, as shown in FIG. 1, or at any other suitable location in system 10.

In some embodiments, station 55 comprises a camera (not shown), which is configured to acquire one or more digital images of the aforementioned ink image printed on sheet 50. In some embodiments, the camera may comprises any suitable image sensor, such as a Contact Image Sensor (CIS) or a Complementary metal oxide semiconductor (CMOS) image sensor, and a scanner comprising a slit having a width of about one meter or any other suitable width.

In the context of the present disclosure and in the claims, the terms “about” or “approximately” for any numerical values or ranges indicate a suitable dimensional tolerance that allows the part or collection of components to function for its intended purpose as described herein. For example, “about” or “approximately” may refer to the range of values ±20% of the recited value, e.g. “about 90%” may refer to the range of values from 72% to 100%.

In some embodiments, station 55 may comprise a spectrophotometer (not shown) configured to monitor the quality of the ink printed on sheet 50.

In some embodiments, the digital images acquired by station 55 are transmitted to a processor, such as processor 20 or any other processor of station 55, which is configured to assess the quality of the respective printed images. Based on the assessment and signals received from controller 54, processor 20 is configured to control the operation of the modules and stations of system 10. In the context of the present invention and in the claims, the term “processor” refers to any processing unit, such as processor 20 or any other processor or controller connected to or integrated with station 55, which is configured to process signals received from the camera and/or the spectrophotometer of station 55. Note that the signal processing operations, control-related instructions, and other computational operations described herein may be carried out by a single processor, or shared between multiple processors of one or more respective computers.

In some embodiments, station 55 is configured to inspect the quality of the printed images and test pattern so as to monitor various attributes, such as but not limited to full image registration with sheet 50, color-to-color (C2C) registration, printed geometry, image uniformity, profile and linearity of colors, and functionality of the print nozzles. In some embodiments, processor 20 is configured to automatically detect geometrical distortions or other errors in one or more of the aforementioned attributes. For example, processor 20 is configured to compare between a design version (also referred to herein as a "master" or a "source image" of a given digital image and a digital image of the printed version of the given image, which is acquired by the camera.

In other embodiments, processor 20 may apply any suitable type image processing software, e.g., to a test pattern, for detecting distortions indicative of the aforementioned errors. In some embodiments, processor 20 is configured to analyze the detected distortion in order to apply a corrective action to the malfunctioning module, and/or to feed instructions to another module or station of system 10, so as to compensate for the detected distortion.

In some embodiments, processor 20 is configured to detect, based on signals received from the spectrophotometer of station 55, deviations in the profile and linearity of the printed colors.

In some embodiments, processor 20 is configured to detect, based on the signals acquired by station 55, various types of defects: (i) in the substrate (e.g., blanket 44 and/or sheet 50), such as a scratch, a pin hole, and a broken edge, and (ii) printing-related defects, such as irregular color spots, satellites, and splashes.

In some embodiments, processor 20 is configured to detect these defects by comparing between a section of the printed and a respective reference section of the original design, also referred to herein as a master. Processor 20 is further configured to classify the defects, and, based on the classification and predefined criteria, to reject sheets 50 having defects that are not within the specified predefined criteria.

In some embodiments, the processor of station 55 is configured to decide whether to stop the operation of system 10, for example, in case the defect density is above a specified threshold. The processor of station 55 is further configured to initiate a corrective action in one or more of the modules and stations of system 10, as described above. The corrective action may be carried out on-the-fly (while system 10 continue the printing process), or offline, by stopping the printing operation and fixing the problem in a respective modules and/or station of system 10. In other embodiments, any other processor or controller of system 10 (e.g., processor 20 or controller 54) is configured to start a corrective action or to stop the operation of system 10 in case the defect density is above a specified threshold.

Additionally or alternatively, processor 20 is configured to receive, e.g., from station 55, signals indicative of additional types of defects and problems in the printing process of system 10. Based on these signals processor 20 is configured to automatically estimate the level of pattern placement accuracy and additional types of defects not mentioned above. In other embodiments, any other suitable method for examining the pattern printed on sheets 50 (or on any other substrate described above), can also be used, for example, using an external (e.g., offline) inspection system, or any type of measurements jig and/or scanner. In these embodiments, based on information received from the external inspection system, processor 20 is configured to initiate any suitable corrective action and/or to stop the operation of system 10.

The configuration of system 10 is simplified and provided purely by way of example for the sake of clarifying the present invention. The components, modules and stations described in printing system 10 hereinabove and additional components and configurations are described in detail, for example, in U.S. Pat. Nos. 9,327,496 and 9,186,884, in PCT International Publications WO 2013/132438, WO 2013/132424 and WO 2017/208152, in U.S. Patent Application Publications 2015/0118503 and 2017/0008272, whose disclosures are all incorporated herein by reference.

The particular configurations of system 10 is shown by way of example, in order to illustrate certain problems that are addressed by embodiments of the present invention and to demonstrate the application of these embodiments in enhancing the performance of such systems. Embodiments of the present invention, however, are by no means limited to this specific sort of example systems, and the principles described herein may similarly be applied to any other sorts of printing systems.

Figure 2B:
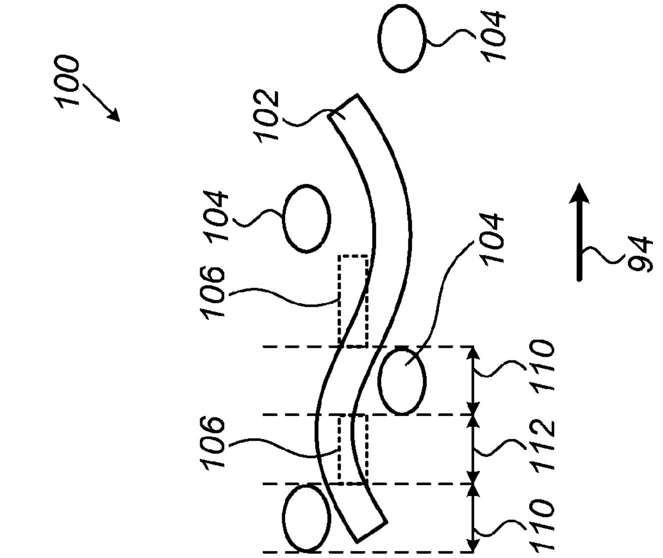
FIG. 2B is a schematic sectional view of a blanket fabric of a digital printing system, in accordance with an embodiment of the present invention.
Figure 2A:
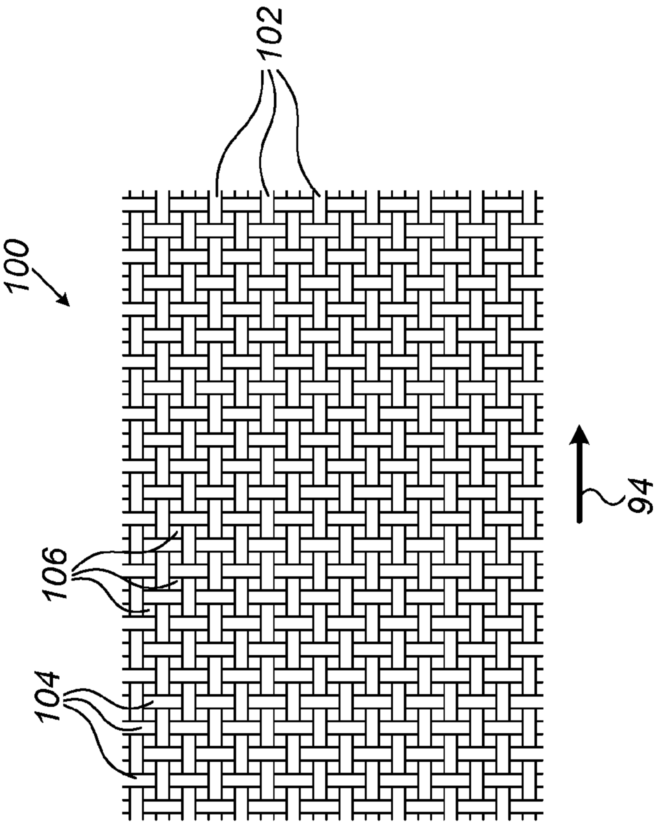
FIG. 2A is a schematic, pictorial illustration of a blanket fabric of a digital printing system, in accordance with an embodiment of the present invention.

FIG. 2A is a schematic, pictorial illustration of a blanket fabric 100 of blanket 44, in accordance with an embodiment of the present invention. Blanket fabric 100 is also referred to herein as "fabric 100" for brevity.

In some embodiments, blanket 44 may comprise fabric 100 and any suitable types of additional layers. Detailed embodiments related to structures of the stacked layers of any suitable blanket, such as blanket 44, are provided for example, in PCT International Publications WO 2017/208144, and in PCT Patent Application PCT/IB2019/055288, whose disclosures are all incorporated herein by reference.

In some embodiments, fabric 100 comprises two or more sets of fibers interleaved with one another. In the present example, fibers 102 and 104 constitute first and second sets of fibers, which are substantially orthogonal to one another. In this configuration, each fiber 102 is interleaved with all fibers 104, and each fiber 104 is interleaved with all fibers 102.

In some embodiments, fabric 100 of blanket 44 has an opacity that varies in accordance with a periodic pattern thereof. In the present example, the periodic pattern of opacity is caused by fibers 102 and 104, whereas openings 106 between fibers 102 and 104 are not opaque (e.g., transparent or translucent) to light as will be described in detail in FIG. 3 below.

In some embodiments, blanket 44 is configured to be moved by substrate transport module 80 (e.g., in the moving direction shown by arrow 94) and to receive ink droplets in the printing process that is carried out by system 10 and forms the image on blanket 44. Note that in the example of fabric 100, fibers 102 are laid out parallel to one another and to the moving direction shown by arrow 94, and fibers 104 are laid out parallel to one another but orthogonal to arrow 94.

In some embodiments, fabric 100 of blanket 44 may comprise any suitable number of fibers, e.g., between 20,000 and 30,000 fibers 104. As will be described in FIG. 3 below, each fiber 104 and/or a distance between adjacent fibers 104 and/or an opening 106 may be used as a position reference along the movement axis of blanket 44.

In other embodiments, the fibers of fabric 100 may have any other suitable configuration. For example, the longitudinal axis of the two or more sets of fibers may have any suitable angle (e.g., other than orthogonal) relative to one another, and may be oriented at any other suitable angle relative to the movement axis of blanket 44, represented by arrow 94. Moreover, in the example of FIG. 2A, opening 106 has a rectangular shape, determined by the orthogonality between fibers 102 and 104. In other embodiments, fibers 102 and 104 may be laid out at another angle relative to one another, such that opening 106 may have a rhombus shape or any other shape, e.g., non-rectangular.

FIG. 2B is a schematic sectional view of fabric 100 shown in FIG. 2A above, in accordance with an embodiment of the present invention. In the example of FIG. 2B, the sectional view is orthogonal to arrow 94, such that a single fiber 102 is interleaved with multiple fibers 104, as described in FIG. 2A above.

In some embodiments, the size of opening 106 and the periodic pattern are determined by the width of the fibers and the distance between any pair of adjacent fibers, which is typically uniform along blanket 44. In the example of FIG. 2B, a width 110 of each fiber 104 determines the aforementioned opacity and a distance 112 between edges of adjacent fibers 104, determines the aforementioned periodic pattern, which is substantially similar to the size of opening 106 along arrow 94.

As described in FIG. 2A above, another sectional view (not shown) that is orthogonal to the sectional view of FIG. 2B, would show a single fiber 104 that is interleaved with multiple fibers 102. Note that in the so-called orthogonal sectional view (not shown), the width of each fiber 102 may determine the aforementioned opacity and the distance between edges of adjacent fibers 102, may determine the aforementioned periodic pattern, which is similar to the size of opening 106 in a direction orthogonal to arrow 94.

In some embodiments, seam 59 (shown and described in FIG. 1 above) may be formed using, inter-alia, thermal processes that may deform or even melt fibers 102 and 104. Thus, seam 59 may not have any fibers, or at least may not have the ordered structure of fibers 102 and 104 of blanket fabric 100.

Figure 3:
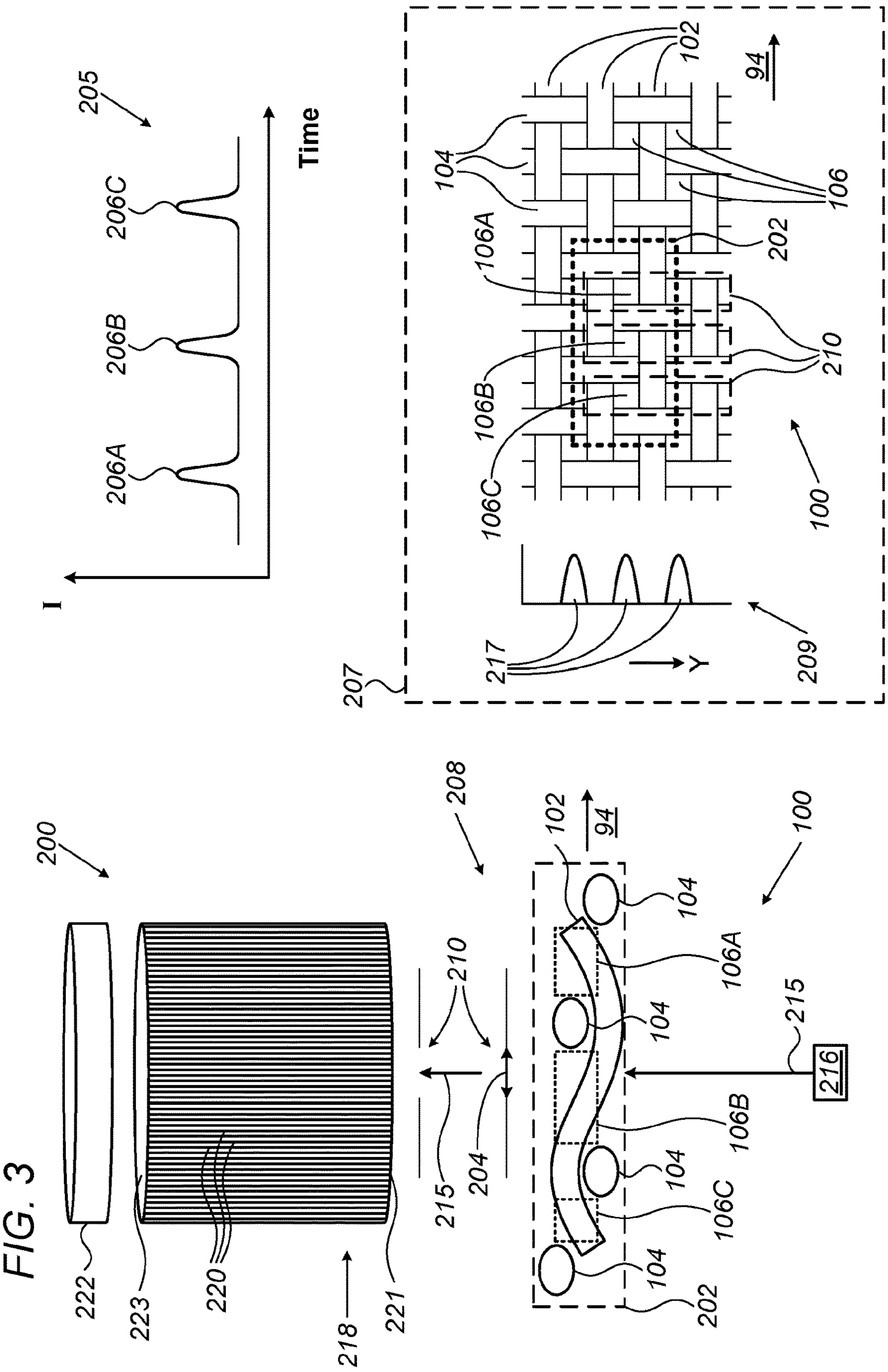
FIG. 3 is a schematic sectional view of a position sensing assembly, in accordance with an embodiment of the present invention.

Deriving Signals Indicative of the Periodic Pattern by Detecting Light Passing Through the Fabric FIG. 3 is a schematic sectional view of a position sensing assembly 200, in accordance with an embodiment of the present invention. In the context of the present disclosure and in the claims, the terms "position sensing assembly" and "optical assembly" are used interchangeably and refer to an optical subsystem, which is configured to (a) illuminate blanket 44 with light, (b) detect the light passing through fabric 100 of blanket 44, and (c) derive from the detected light a signal indicative of the periodic pattern described in FIGS. 2A and 2B above. As described above, blanket 44 may comprise fabric 100 and any suitable types of additional layers.

In some embodiments, at least one of the aforementioned additional layers may be transparent or translucent to light having suitable one or more wavelengths. As will be described in detail below, a suitable light illuminating blanket 44 may pass through openings 106 of fabric 100 shown in FIGS. 2A and 2B and be detected by a sensor.

In some embodiments, system 10 is configured to move blanket 44, at a predefined and controlled speed, in the moving direction represented by arrow 94.

In an example embodiment shown in FIG. 3, fabric 100 of blanket 44 comprises three openings 106A, 106B and 106C, which are located between respective pairs of adjacent fibers 104 of fabric 100. Note that openings 106A, 106B and 106C are also located between adjacent fibers 102, as shown for openings 106 in the top view of FIG. 2A. The sectional view of FIG. 3 cannot show the dimension orthogonal to arrow 94 and therefore openings 106A, 106B and 106C are shown as dashed frames so as to illustrate that they are also situated between two adjacent fibers 102, as shown in the top view of FIG. 2A above.

In some embodiments, position sensing assembly 200 is configured to detect the position of openings 106A, 106B and 106C in blanket 44, and to derive from the detected position a signal indicative of the aforementioned periodic pattern. As will be described in detail below, the disclosed techniques may obtain, for a given opening, one or more signals that are indicative of one or more respective positions of the given opening (e.g., by using a plurality of position sensing assemblies 200 mounted on system 10 along blanket 44). These techniques may also be applied to multiple openings or other features of fabric 100, so as to estimate the actual position of selected points of blanket 44, and to control the printing process of system 10 based on these signals. In some embodiments, openings 106A, 106B and 106C and fibers 104, may serve as a scale that encodes one or more predefined locations on or within blanket 44. In such embodiments, blanket 44 may serve as an encoder scale of position sensing assembly 200 to sense the position of predefined fibers 104 and/or of openings, such as openings 106A, 106B and 106C. In other words, blanket 44 has integrated encoder scale features, such as but not limited to fibers 104 and openings 106A, 106B and 106C. Moreover, a combination of blanket 44 and position sensing assembly 200 (or any other suitable position sensing device configured to detect one or both of fibers 104 and openings 106A, 106B and 106C) may serve as a linear encoder for controlling the motion of blanket 44 and for controlling the printing process of system 10. In other words, blanket 44 has an integrated encoder scale for controlling the motion of blanket 44 relative to various stations and modules of system 10.

In some embodiments, position sensing assembly 200 comprises a light source 216, such as one or more light emitting diodes (LEDs), or one or more lasers or any other suitable type of light source configured to emit any suitable range of wavelengths or a monochromatic wavelength having sufficiently-high luminous intensity (e.g., about 4500-9000 mcd). For example, a power SMD LED PLCC-2 Plus product supplied by Vishay (Malvern, Pennsylvania). Light source 216 is configured to emit and direct one or more collimated light beams, such as light beam 215, which may pass through openings 106A, 106B and 106C of fabric 100.

In some embodiments, position sensing assembly 200 may comprise one or more channels, wherein each channel may comprise a light source and a respective sensor described below.

In other embodiments, blanket 44 may not have openings, such as opening 106A-106C, or may comprise at least one layer not transparent or translucent to white light. In such embodiments, position sensing assembly 200 may emit light comprising wavelengths that can pass through fabric 100 and are yet affected by the periodic pattern. For example, position sensing assembly 200 may emit infrared (IR) radiation configured to pass through the layers of blanket 44, and yet, having an altered intensity indicative of the periodic pattern.

In some embodiments, position sensing assembly 200 comprises a slit assembly 208 having one or more slits, such as a slit 210 having an opening 204. Slit 210, which is configured pass light beam 215 that have passed through openings 106A, 106B and 106C as described above.

In some embodiments, in case slit assembly 208 comprises two or more slits located at a predefined distance from one another, slit assembly 208 may comprises a shield (not shown), which is configured to block stray light or light scattered, for example, between adjacent slits of slit assembly 208.

In some embodiments, position sensing assembly 200 comprises a fiber assembly 218 having a bundle of multiple optical fibers 220 laid out between a lower surface 221 and an upper surface 223 of fiber assembly 218. In some embodiments, surfaces 221 and 223 are transparent to light beam 215, and optical fibers 220 are configured to convey light beam 215 through fiber assembly 218. In case of multiple light beams and/or multiple slits, optical fibers 220 are adapted to block interferences between the different light beams.

As shown in FIG. 3, position sensing assembly 200 may comprise a single light beam 215 and a single slit 210. In alternative embodiments, fiber assembly 218 may comprise a single fiber or any other suitable type of an optic channel, which is configured to convey light beam 215 there-through as described above for fiber assembly 218.

In some embodiments, position sensing assembly 200 comprises a sensor 222, which may comprise a suitable type of a photodiode, such as a silicon PIN photodiode SFH 206 K product supplied by OSRAM Opto Semiconductors GmbH (Regensburg, Germany) or any other suitable sensing apparatus.

In some embodiments, sensor 222 of position sensing assembly 200 is configured to sense light beam 215, which passes through the aforementioned openings of fabric 100, and to derive from the sensed light a signal, such as current intensity over time, which is indicative of the periodic pattern described above.

Reference is now made to an inset 207 showing a top view of a section of fabric 100 that is moved with blanket 44 in the direction of arrow 94. In some embodiments, slit 210 of position sensing assembly 200 is typically stationary, but is shown in inset 207 as three dashed rectangles located at three positions relative to fabric 100 due to the movement of blanket 44.

In some embodiments, slit 210 may be sized along the Y-axis of blanket 44 so as to cover a predefined section or the entire width of blanket 44. In an example embodiment shown in a graph 209 of inset 207, in response to light of beam 215 that passes through openings 106 and 106C and through slit 210, sensor 222 is configured to generate an electrical current signal 217 indicative of the light intensity sensed between two adjacent fibers 104. As shown in graph 209, each electrical current signal 217 is aligned with a respective opening, e.g., opening 106 or 106C. Note that electrical current signals 217 of graph 209 are indicative of the periodic pattern of the respective section of fabric 100.

Reference is now made to a graph 205 showing the current intensity (I) of the signals generated by sensor 222 over time. In some embodiments, sensor 222 is configured to derive from the sensed light signals 206A, 206B and 206C indicative of the electrical current signals sensed at respective positions of openings 106A, 106B and 106C. Note that signals 206A, 206B and 206C are also indicative of the periodic pattern that is described in FIGS. 2A and 2B above. In other words, each opening from among openings 106A, 106B and 106C is a pattern unit of the periodic pattern of blanket 44, and each light signal from among light signals 206A, 206B and 206C (also referred o herein as a pulse) is indicative of a respective pattern unit (e.g., from among openings 106A, 106B and 106C) detected by sensor 222 of position sensing assembly 200.

In some embodiments, sensor 222 may comprise a controller (not shown), which is configured to calculate signals 206A, 206B and 206C based on a statistical analysis of the respective electrical current signals acquired by sensor 222. For example, the intensity of signal 206C of graph 205 may be calculated based on an average or a median of the intensity of electrical current signals 217 shown in graph 209.

In other embodiments, processor 20 is configured to calculate signals 206A, 206B and 206C based on the aforementioned statistical analysis of the respective electrical current signals acquired by sensor 222.

As shown in the sectional view and top view of fabric 100, a virtual frame 202 may be used for describing the signal acquisition and processing flow. Note that frame 202 is shown only for conceptual clarity of the description, and is not part of blanket 44 or assembly 200.

In some embodiments, system 10 moves blanket 44 at a predefined speed in the moving direction represented by arrow 94, and light source 216 emits light beam 215. When opening 106A is aligned with opening 204 of slit 210, light beam 215 passes through opening 106A of fabric 100 and fiber assembly 218, and is sensed by sensor 222.

In some embodiments, sensor 222 outputs a signal 206A, indicative of the sensed intensity of light beam 215 and of the position of opening 106A. In the meantime, system 10 keeps moving blanket 44 at the predefined speed in the direction of arrow 94. When opening 106B is aligned with slit 210, light beam 215 passes there-through and though slit 210 and fiber assembly 218. Subsequently, light beam 215 that passed through opening 106B, is sensed by sensor 222, which outputs signal 206B indicative of the position of opening 106B. Subsequently the same signal acquisition process repeats for opening 106C with system 10 moving blanket 44, such that when opening 106C is aligned with slit 210, light beam 215 passes there-through and though slit 210 and fiber assembly 218. Subsequently, light beam 215 that passed through opening 106C, is sensed by sensor 222, which outputs signal 206C indicative of the position of opening 106C.

Note that in the example configuration of FIG. 3, position sensing assembly 200 is configured to produce three different signals 206A, 206B and 206C, indicative of the positions of openings 106A, 106B and 106C, respectively.

In some embodiments, processor 20 is configured to receive at least one of signals 206A, 206B and 206C and to control the printing process of system 10 based on the received signal. As described above, blanket 44 is configured to serve as a scale that encodes the position of predefined features, such as openings 106A, 106B and 106C over time. In other words, a combination of blanket 44 and position sensing assembly 200, constitutes a motion-control encoder of system 10. Note that: (i) when position sensing assembly 200 is facing, for example, dancer assembly 74, the combination of blanket 44 and position sensing assembly 200 constitutes a rotary encoder, and (ii) when position sensing assembly 200 is facing a linear section, e.g., along the upper run or lower run of blanket 44, the combination of blanket 44 and position sensing assembly 200 constitutes a linear encoder.

In an embodiment, based on the speed of blanket 44 and of the aforementioned signals 206A, 206B and 206C, processor 20 may control the timing of the ink jetting from nozzles of one or more print heads. For example, processor 20 may receive from position sensing assembly 200, more than 20,000 signals indicative of the respective position reference points of more than 20,000 openings 106 of fabric 100, and based on the received signals, to improve the C2C registration of the image printed on blanket 44. Note that by having more than 20,000 position reference points along blanket 44, processor 20 may apply position-based methods, rather than speed-based methods for controlling the printing process of system 10.

As described in FIG. 1, it is possible to use one or more encoders, e.g., for measuring the motion (e.g., speed) of blanket 44. This measurement, however, is indirect and therefore prone to errors. For example, insufficient rigidity of the assembly, mounting errors, and thermal expansion of the rotary scale may result in measurement accuracy errors of the encoder. Note that the measurement accuracy error typically accumulates with every cycle of the rotary encoder and may cause various registration errors (e.g., C2C and image-to-substrate registration errors) during the printing process and in monitoring and calibration various assemblies and/or stations of system 10.

In some embodiments, position sensing assembly 200 is configured to directly measure the position of a reference point on blanket 44, e.g., by producing signals 206A, 206B and 206C, indicative of the positions of openings 106A, 106B and 106C, respectively. In other embodiments, based on signals received from position sensing assembly 200 when blanket 44 moves in the direction of arrow 94, processor 20 may count the number of fibers 104 in blanket 44, and therefore, has a direct position measurement of any feature on blanket 44.

In such embodiments, processor 20 may adjust various types of process parameters, such as the local speed of blanket 44 and/or the jetting time of different color inks jetted from specific nozzles, in order to improve the C2C registration of the printing process carried out by system 10. Additionally or alternatively, based on the signals received from position sensing assembly 200, processor 20 is configured to improve the placement accuracy of one or more ink droplets jetted on the surface of blanket 44, which may improve the image-to-substrate registration of system 10.

In some embodiments, in duplex printing systems the improved placement accuracy of the ink droplets may assist in improving the registration between images printed on the front and back sides of the target substrate (e.g., sheet or web). It will be understood that having the images printed accurately on blanket 44 may not guarantee improved image-to-substrate registration, for example in case of undesired registration errors that may occur in other stations of system 10, e.g., in impression station 84. In some embodiments, processor 20 may use the aforementioned signals for improving the C2C registration by compensating for known problems in system 10. For example, known misalignment between two or more print bars 62.

In some embodiments, by receiving signals indicative of a large number (e.g., over 20,000) of position reference points along blanket 44, processor 20 may control the printing process of system 10 without being affected by local damage or contamination that may occur on blanket 44 and may obscure or cover one or more position reference points located along blanket 44.

In some embodiments, based on the signals, such as signals 206A, 206B and 206C, processor 20 is configured to identify errors and/or malfunctions of system 10. For example, processor 20 may set or calculate the moving speed of blanket 44 and may receive the aforementioned signals of two or more specific openings located along fabric 100 of blanket 44. In such embodiments, processor 20 is configured to estimate the distances between the respective specific openings and to estimate whether or not blanket 44 has been deformed, e.g., due to over stretching, over heating or aging thereof. These embodiments are further detailed in FIG. 5 below.

In some embodiments, blanket 44 may be replaced as part of preventive maintenance procedures. In such embodiments, processor 20 is configured to monitor various parameters along the life cycle of blanket 44. For example, based on the signals received from position sensing assembly 200, processor 20 is configured to produce a "fingerprint" of each blanket 44 mounted on system 10.

In some embodiments, the fingerprint may comprise parameters or variables having specific values for each blanket 44. For example, based on the signals received from position sensing assembly 200, processor 20 is configured to: (a) count the number of fibers 102 and 104 constituting fabric 100, (b) estimate the average width of a group of fibers, (c) estimate the distance between adjacent fibers, and (d) estimate the size and position of a defect in blanket 44.

In some embodiments, processor 20 is configured to monitor the fingerprint of a given blanket 44 over time, and based on predefined criteria, processor 20 can manage at least part of preventive maintenance activities of system 10, and particularly of blanket 44. For example, by monitoring the distance between adjacent fibers, processor 20 may detect overstretching of blanket 44, and responsively, may schedule a preventive replacement of the overstretched blanket 44.

In such embodiments, processor 20 may hold one or more thresholds for controlling and compensating for the stretching of blanket 44. For example, when the distance between adjacent fibers is larger than a predefined threshold, processor 20 may display an alert of stretched blanket on display 34, moreover, processor 20 may adjust the moving speed of blanket 44, or other process parameters of system 10, so as to compensate for the excess blanket stretching.

In the example configuration shown in FIG. 3, light source 216 and sensor 222 are positioned at different sides of blanket 44 and the detected light passes through the periodic pattern of fabric 100. In alternative embodiments, blanket 44 may comprise a reflective periodic pattern and the light source. In such embodiments, the sensor and light source of the position sensing assembly may be mounted at the same side of the blanket, using any suitable configuration for acquiring position signals using bright-field and/or dark-field imaging and detection techniques.

In yet other embodiments, the blanket may comprise a periodic pattern that may be detected using any suitable non-optical techniques. For example, blanket 44 may comprise magnetic elements arranged in a periodic pattern, and sensor 222 may comprise a magnetic sensor, which is configured to detect on the blanket magnetic-based position reference points.

Some of the alternative position sensing techniques described above may affect the configuration of the position sensing assembly. For example, the light source and the slit may be removed from the configuration of a magnetic-based position sensing assembly, and the slit may be removed from the configuration of a dark-field-based position sensing assembly.

This particular configuration of position sensing assembly 200 and fabric 100 of blanket 44 are shown by way of example, in order to illustrate certain problems, such as C2C registration and blanket stretching, which are addressed by embodiments of the present invention and to demonstrate the application of these embodiments in enhancing the performance of a digital printing system, such as system 10. Embodiments of the present invention, however, are by no means limited to this specific sort of example system, and the principles described herein may similarly be applied to other sorts of position sensing assemblies and/or blankets and/or printing systems.

Figure 4:
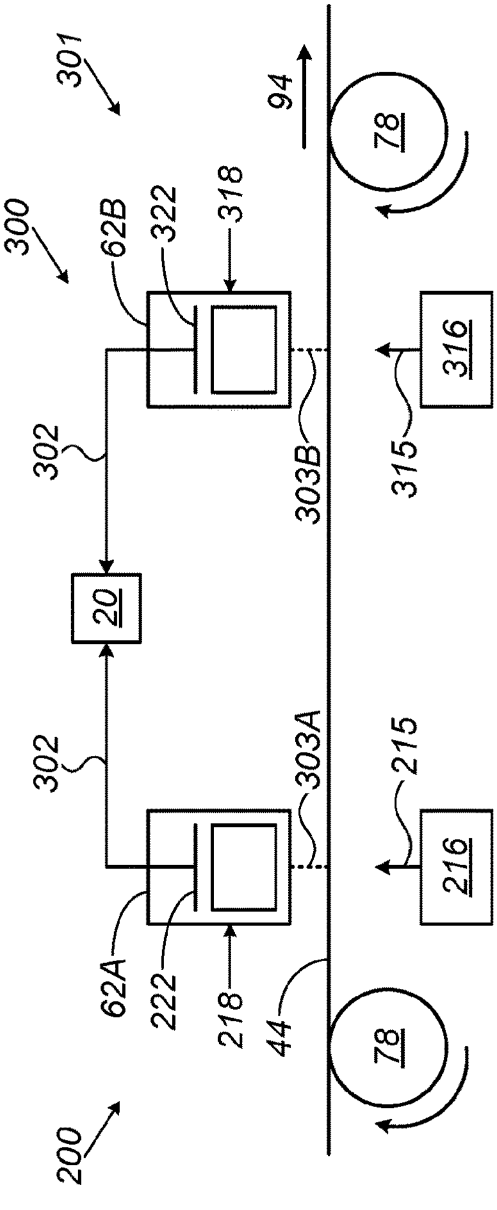
FIG. 4 is a schematic sectional view of a process control assembly, in accordance with an embodiment of the present invention.

Controlling the Printing Process Based on Signals Indicative of the Periodic Pattern FIG. 4 is a schematic sectional view of a process control assembly (PCA) 300, in accordance with an embodiment of the present invention. In some embodiments, PCA 300 comprises position sensing assembly 200, which is aligned with a print bar 62A, and a position sensing assembly 301, which is aligned with a print bar 62B.

In some embodiments, position sensing assemblies 200 and 301 may be mounted on print bars 62A and 62B, respectively. Note that print bars 62A and 62B may be implemented in system 10 and/or may replace any of print bars 62 shown in FIG. 1 above.

In some embodiments, print bars 62A and 62B may be similar, but are typically jetting different colors of ink. For example, print bar 62A may jet one or more droplets of black ink 303A and print bar 62B may jet one or more droplets of magenta ink 303B.

In some embodiments, position sensing assemblies 200 and 301 may have a similar configuration, such that light sources 216 and 316 are similar to one another, fiber assemblies 218 and 318 are similar to one another, and sensors 222 and 322 are similar to one another. Note that system 10 may comprise additional position sensing assemblies having the same configuration of position sensing assembly 200, each of which may be mounted on, and/or aligned with, a different print bar, such as the plurality of print bars 62 shown in FIG. 1 above.

In the context of the present disclosure and in the claims, the term "alignment" between a given position sensing assembly and a respective print bar refers to directing the light and ink to the same position, or at a predefined offset from one another, on the surface of blanket 44. In an example embodiment, light source 216 may direct beam 215 to a position on blanket 44 where print bar 62A jets one or more droplets of ink 303A.

In another embodiment, processor 20 may hold a predefined offset between the positions of beam 215 and ink 303A landing on blanket 44, and consider the predefined offset in the calculation of the related printing control parameters, such as but not limited to, ink jetting time and blanket movement speed.

In some embodiments, when PCA 300 is facing a linear section, such as the linear section shown in FIG. 4 between adjacent rollers 78, the combination of blanket 44 and PCA 300 constitutes a linear motion encoder for controlling the motion of blanket 44, e.g., relative to print bars 62A and 62B of image forming station 60.

As described in FIG. 3 above, each position sensing assembly, e.g., from among position sensing assemblies 200 and 301, is configured to send, via one or more cables 302, the acquired signals, such as signals 206A, 206B and 206C, to processor 20, and/or to any suitable printing controller of system 10, for controlling the printing process described in FIG. 3 above.

In other embodiments, the configuration of at least one position sensing assembly, e.g., position sensing assembly 301, may differ from that of position sensing assembly 200 in at least one element. For example, light source 316 may emit one or more light beams, such as light beam 315, which may have a different spectrum of wavelengths or a different power compared to that of beam 215.

In alternative embodiments, all position sensing assemblies that are mounted on and/or aligned with the respective print bars may have the same configuration. In these embodiments system 10 may comprise at least one additional position sensing assembly having a different configuration. The additional position sensing assembly is configured to sense different signals, which are indicative of different information that may be used by processor 20 for conducting measurements and/or for inspecting specific types of defects that may exist on blanket 44. In such embodiments, processor 20 may use the different signals as complementary information in addition to the signals received from the position sensing assemblies having the same configuration of position sensing assembly 200.

In some embodiments, the one or more additional position sensing assemblies may be mounted on print bars 62 of image forming station 60 that are not in use in the printing application. Additionally or alternatively, the one or more additional position sensing assemblies may be mounted on any other suitable mounting location of system 10.

Figure 5:
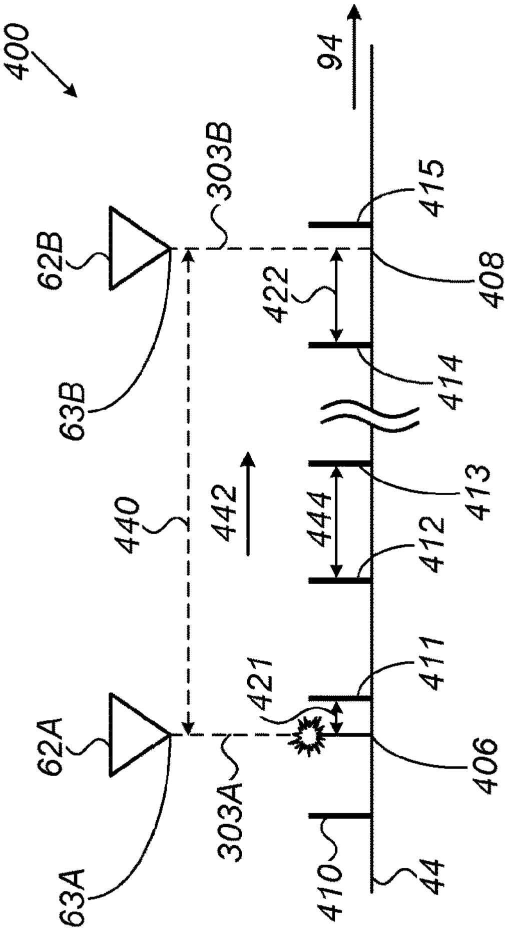
FIG. 5 is a block diagram that schematically illustrates a method for synchronizing a distance measured on a blanket with a pitch size between two nozzles of different print heads, in accordance with an embodiment of the present invention.

Improving Printing Registration Based on Signals Acquired by Multiple Position Sensing Assemblies FIG. 5 is a block diagram 400 that illustrates a method for synchronizing a distance measured on blanket 44 with a pitch size between two nozzles of different print heads, in accordance with an embodiment of the present invention.

In some embodiments, block diagram 400 comprises print bars 62A and 62B having respective nozzles 63A and 63B of print heads, which are configured to jet one or more droplets black ink 303A and magenta ink 303B, respectively. In some embodiments, nozzles 63A and 63B are positioned at a distance 440 from one another, and are configured to direct respective droplets of inks 303A and 303B to land on blanket 44 at positions 406 and 408, respectively.

As described above, blanket 44 is moved along the movement axis shown by arrow 94, and position sensing assemblies 200 and 301 (shown in FIG. 4 above) derive the one or more signals indicative of the periodic pattern formed by the fibers of blanket 44. In some embodiments, processor 20 counts the number of signals indicative of the position of respective fibers passing through position sensing assemblies 200 and 301 when blanket moves in the direction of arrow 94. In some embodiments, based on distance 440, the signals received from position sensing assemblies 200 and 301, and a time interval 442 that takes a position reference point to pass between positions 406 and 408, processor 20 is configured to calculate the speed of blanket 44. In some embodiments, time interval 442 comprises the duration between jetting black ink 303A and magenta ink 303B, which obtains the specified C2C registration between the black and magenta images.

In some embodiments, fibers 410, 411, 412, 413, 414 and 415 of block diagram 400 are representing the aforementioned fibers of blanket 44, such as fibers 104 shown in FIGS. 2A, 2B and 3 above. For the sake of conceptual clarity, in the present example four of the fibers, i.e., fibers 411-414, are located within distance 440, it will be understood that a real-life blanket 44 typically comprises hundreds or thousands of fibers within distance 440. In the present example, a pair of adjacent fibers, such as fibers 412 and 413 has a nominal distance 444 between the fibers, which is designed to be substantially identical between any pair of adjacent fibers from among fibers 410-415 (e.g., a distance of about 470 μm±10 μm between fibers 411 and 412, between fibers 412 and 413, and between fibers 413 and 414).

In some embodiments, processor 20 holds a threshold indicative of the maximal specified distance 444 of blanket 44. Based on the signals received from position sensing assemblies 200 and 301, processor 20 is configured to measure the actual value of distance 444 using the following sequence: At a step 1, processor 20 controls print bar 62A to direct, via nozzle 63A, one or more droplets of ink 303A to land on blanket 44 at position 406, which is located at a distance 421 from fiber 411.

At a step 2, processor 20 controls blanket module 70 to move blanket 44 at a constant speed and measures time interval 442 that takes to position ink 303A that was jetted at step 1, at position 408 of blanket 44. Additionally or alternatively, processor 20 may receive from position sensing assemblies 200 and 301, signals indicative of any other position reference point (e.g., fiber 410 or 411) passing between positions 406 and 408, and measures the corresponding duration, i.e., time interval 442.

At a step 3 that may be carried out simultaneously with step 2, processor 20 counts the number of fibers passed between positions 406 and 408 during time interval 442 (using the signals received from position sensing assemblies 200 and 301), and adds distances 421 and 422, which are fractions of distance 444. In the example of FIG. 5, distance 440 equals a sum of four distances 444, and four widths of fibers 411-414, and distances 421 and 422.

At a step 4, based on distance 440, time interval 442 and the signals received from position sensing assemblies 200 and 301, processor 20 calculates the actual speed of blanket 44 during time interval 442, and an average value of the actual size of distance 444, based on the distance measured between fibers 411 and 414. Subsequently, processor 20 compares between the calculated actual size of distance 444 and the threshold indicative of the specified size of distance 444, and determines whether or not blanket 44 is overstretched, e.g., by module 80 of system 10.

In some embodiments, processor 20 is further configured to issue an alert in response to detecting overstretching of blanket 44, and/or to reduce the tension applied to blanket 44, e.g., by dancer assembly 74.

In an embodiment, based on signals received from position sensing assemblies 200 and 301, processor 20 is configured to adjust the tension applied to blanket 44, e.g., by dancer assembly 74. For example, processor 20 may control dancer assembly 74 to adjust the applied tension so as compensate for overheating (measured by temperature sensors described in FIG. 1 above) or overstretching (measured by the change of distance between adjacent fibers) of blanket 44. Similarly, processor 20 may control dancer assembly 74 to increase the applied tension so as compensate for insufficient stretching of blanket 44.

In some embodiments, based on the signals received from position sensing assemblies 200 and/or 301, processor 20 is configured to improve the placement accuracy of one or more ink droplets jetted on the surface of blanket 44. As described above, the improved placement accuracy may also improve the image-to-substrate registration of system 10 and registration between images printed in different sides of a target substrate in a duplex printing system.

In some embodiments, processor 20 may hold one or more thresholds indicative of the specified registration errors (e.g., C2C and image-to-substrate registration errors) of system 10. Based on the signals received from position sensing assemblies 200 and/or 301, processor 20 is configured to detect whether the image printed on blanket 44 has one or more registration errors exceeding the specified registration errors indicated by the aforementioned thresholds.

In such embodiments, processor 20 is configured to adjust the image transfer process from blanket 44 to sheet 50, for example, by adjusting parameters of impression station 84, in order to compensate for the registration error. In case the registration error cannot be adjusted, processor 20 may abort the image transfer (e.g., by disengaging between impression cylinder 82 and pressure cylinder 90) and remove the respective image from blanket 44.

In other embodiments, processor 20 may hold an image printing on blanket 44, for example, in response to detecting severe overstretching of blanket 44.

Estimating Relative Elongation Between Seam and Blanket Fabric

FIG. 6 is a block diagram that schematically illustrates a method for estimating relative elongation between seam 59 and a fabric section 61 of blanket 44, in accordance with an embodiment of the present invention. In some embodiments, the method is using fiber events 504 received from position sensing assembly 200. In the context of the present disclosure and in the claims, the term "fiber event" refers to a signal indicative of the periodic pattern described in FIGS. 2A and 2B above.

In some embodiments, after mounting blanket 44 on system 10, processor 20 is configured to control: (i) dancer assembly 74 to apply a predefined tension force, T1, to blanket 44, and (ii) blanket module 70 to move blanket 44 along the moving direction, represented by arrow 94. In the present example, seam 59 is defined as the distance between fibers 104A and 104B, and has a length 501 (e.g., between about 10 cm and 15 cm).

In some embodiments, processor 20 may select, along blanket 44, fabric section 61, which is defined between fibers 104C and 104D and has a length 502, which is similar to that of length 501 when applying T1 and moving blanket 44. Note that selected fabric section 61 may be located at any suitable distance from seam 59. For example, at a distance of about five or ten meters from seam 59, but may also be located in close proximity (e.g., about 20 cm) from seam 59. Moreover, note that blanket 44 moves in repeating cycles, also referred to herein as revolutions, so that lengths 501 and 502 are measured several times (e.g., during each revolution) when blanket 44 is moving in speed V (e.g., a constant moving speed of any suitable printing process).

In some embodiments, position sensing assembly 200 is configured to send processor 20, a fiber event 504 in response to detecting each fiber 104. In the present example, at a first point of time (POT), processor 20 is configured to receive a fiber event 504A produced when position sensing assembly 200 senses the position of fiber 104A moving with blanket 44. Similarly, processor 20 is configured to receive, at second, third and fourth POTs, fiber events 504B, 504C and 504D, produced when position sensing assembly 200 senses the position of fibers 104B, 104C and 104D, respectively.

As described in FIG. 1 above, seam 59 does not have the ordered structure of fibers 102 and 104 of blanket fabric 100, and therefore: (i) may have mechanical properties, such as an elastic modulus, different from that of blanket fabric 100, and (ii) position sensing assembly 200 may not be able to produce fiber events 504 within section 502 of seam 59.

In some embodiments, processor 20 is configured to hold the POTs of fire events sensed, by position sensing assembly 200, at each revolution of blanket 44. In the present example, based on the POTs of receiving fiber events 504A-504D in revolution n, processor 20 may calculate the size of lengths 501 and 502 in revolution n, which are described herein using equations (1) and (2), respectively:

$$X_S^n = X_S^{n=0} + \Delta X_X^n \quad (1)$$

$$X_F^n = X_F^{n=0} + \Delta X_F^n \quad (2)$$

wherein $X_S^n$ and $X_F^n$ denote the size of lengths 501 and 502 measured, respectively, during a blanket revolution n, $X_S^{n=0}$ and $X_F^{n=0}$ denote the size of lengths 501 and 502 measured, respectively, during the first measured revolution, $\Delta X_S^n$ and $\Delta x_F^n$ denote the absolute elongation of lengths 501 and 502 between revolution n and the first measured revolution.

The absolute elongations of lengths 501 and 502 are described herein using equations (3) and (4), respectively:

$$\Delta X_S^n = X_S^n - X_S^{n=0} \quad (3)$$

$$X_F^n = X_F^n - \Delta X_F^{n=0} \quad (4)$$

Based on an elementary physical law asserting that a given length (x) is obtained by multiplying speed (v) and time (t), the relative elongation between length 501 of seam 59 and length 502 of fabric section 61 between the first and the nth revolutions, is described using equation (5):

$$\frac{\Delta X_S^n}{\Delta X_F^n} = \frac{V \cdot (T_S^n - T_S^0)}{V \cdot (T_F^n - T_F^0)} \quad (5)$$

wherein V denotes the moving speed of blanket 44 during between the first and the nth revolutions, $T_S^n$ and $X_F^n$ denote the POTs received from position sensing assembly 200, at the nth revolution, which is indicative of the size of lengths 501 and 502, respectively, $T_S^0$ and $X_F^0$ denote the POTs received from position sensing assembly 200, at the first revolution, which is indicative of the size of lengths 501 and 502, respectively.

In some embodiments, based on equation (5), processor 20 is configured to estimate the relative elongation between length 501 of seam 59 and length 502 of fabric section 61. Note that the moving speed, V, may be reduce from both the numerator and denominator of equation (5), and therefore, based on the POTs of fiber events 504A-504D received in the first and nth revolutions, processor 20 is configured to estimate the relative elongation between length 501 of seam 59 and length 502 of fabric section 61.

As described above, the relative elongation may occur due to a different elastic modulus, also denoted Young's modulus, between blanket fabric 100 and seam 61, and depends on the tension applied to blanket 44, which is moved in the moving direction by blanket module 70. In some embodiments, processor 20 is configured to hold a table of relative elongations caused when applying respective tensions to blanket 44.

In some embodiments, producing the table may be carried during printing processes of system 10, without allocation of any resources, but process management and processing time of processor 20. Therefore, the table may be produced for each blanket 44 mounted on each system 10, and may be monitored over the life time of a given blanket 44 for monitoring the conditions (e.g., mechanical properties) of both blanket fabric 100 and seam 59.

In some embodiments, processor 20 is configured to monitor or control system 10 based on the ratio, which is shown in equation (5) and is calculated for one or more revolutions of blanket 44.

In other embodiments, processor may use the technique described above for defining, along blanket 44, multiple fabric section 61, wherein the multiple fabric sections have one or more predefined distances from seam 59 and from one another.

FIG. 7 is a schematic, pictorial illustration of a system 600 for cutting blanket fabric 100 during the production of blanket 44, in accordance with an embodiment of the present invention.

In some embodiments, system 600 comprises position sensing assembly 200 having light source 216, which is configured to direct light beam 215 that passes through blanket fabric 100 and fiber assembly 218, and detected by sensor 222 as described in detail in FIG. 3 above.

In some embodiments, system 600 comprises a computer 610, which is configured to send control signals, via a cable 618, to a subsystem 602 having a motion assembly 620 and a production surface, in the present example, a table 622. Motion assembly 620 is configured for conveying blanket fabric 100, over table 622 along an axis parallel to a moving direction 616 of fabric 100. Computer 610 is further configured to receive from position sensing assembly 200 via a cable 614, light signals 206 indicative of the positions of respective openings 106 of blanket fabric 100, as described in FIG. 3 above.

In some embodiments, system 600 comprises a fabric cutting subsystem 604 having a blade 606 configured to move in a direction 608 for cutting blanket fabric 100. In other embodiments, cutting subsystem 604 may have any other configuration suitable for cutting blanket fabric 100.

In some embodiments, computer 610 is configured to hold a number, e.g., between about 20,000 and 30,000, indicative of the number of light signals 206, indicative of the specified number of fibers 104 in blanket 44 as described in FIG. 2A above. Based on light signals 206, computer 610 is configured to count the number of light signals 206 (indicative of respective fibers 104), and to determine a cutting position at which to cut blanket fabric 100. Computer 610 is further configured to send, via a cable 612, control signals to fabric cutting subsystem 604 for cutting fabric 100 when reaching the aforementioned specified number of fibers.

In the example of FIG. 7, blanket fabric 100A has been cut by fabric cutting subsystem 604, and computer 610 is counting the number of fibers 104 in blanket fabric 100B, based on signals 206 received from position sensing assembly 200, as described above.

In some embodiments, computer 610 is configured to control motion assembly 620 to adjust the moving speed of blanket fabric 100 during the process for cutting blanket fabric 100. For example, the process may comprise (i) a first time interval, at which computer 610 counts light signals 206 and determines the cutting position at which to cut blanket fabric 100, and (ii) a second time interval, at which computer 610 controls cutting subsystem 604 to cut blanket fabric 100. In such embodiments, computer 610 is configured to control motion assembly 620 to move blanket fabric 100 at a first speed (e.g., about 5 meters per second) during the first time interval, and at a second lower speed or even a full stop (zero speed) at the second time interval, so as to obtain accurate cutting of blanket fabric 100.

In other embodiments, the technique described above may be used, mutatis-mutandis, for cutting any sort of a flexible substrate (or a rigid substrate) having a periodic pattern.

The disclosed techniques enable improved accuracy (i.e., accurate size of blanket fabric 100) and repeatability (i.e., having identical length of all blanket fabrics 100 cut by system 600) when cutting blanket fabrics 100 during the production of blanket 44. Note that by counting the number of fibers 104, system 600 is not affected by changes in parameters such as temperature and elasticity of blanket fabric 100, and therefore, system 600 may obtain improved accuracy and repeatability of the length of blanket fabrics 100.

Typically, computer 610 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. In the context of the present disclosure and in the claims, computer 610 is also referred to as a processor, which is configured to carry out all the functions of computer 610 described above.

This particular configuration of system 600 is shown by way of example, in order to illustrate certain problems that are addressed by embodiments of the present invention and to demonstrate the application of these embodiments in enhancing the performance of such a system. Embodiments of the present invention, however, are by no means limited to this specific sort of example system, and the principles described herein may similarly be applied to other sorts of systems for producing blanket 44 and for producing other types of fabrics, which are typically flexible and having an ordered structure (e.g., cotton).

Figure 8:
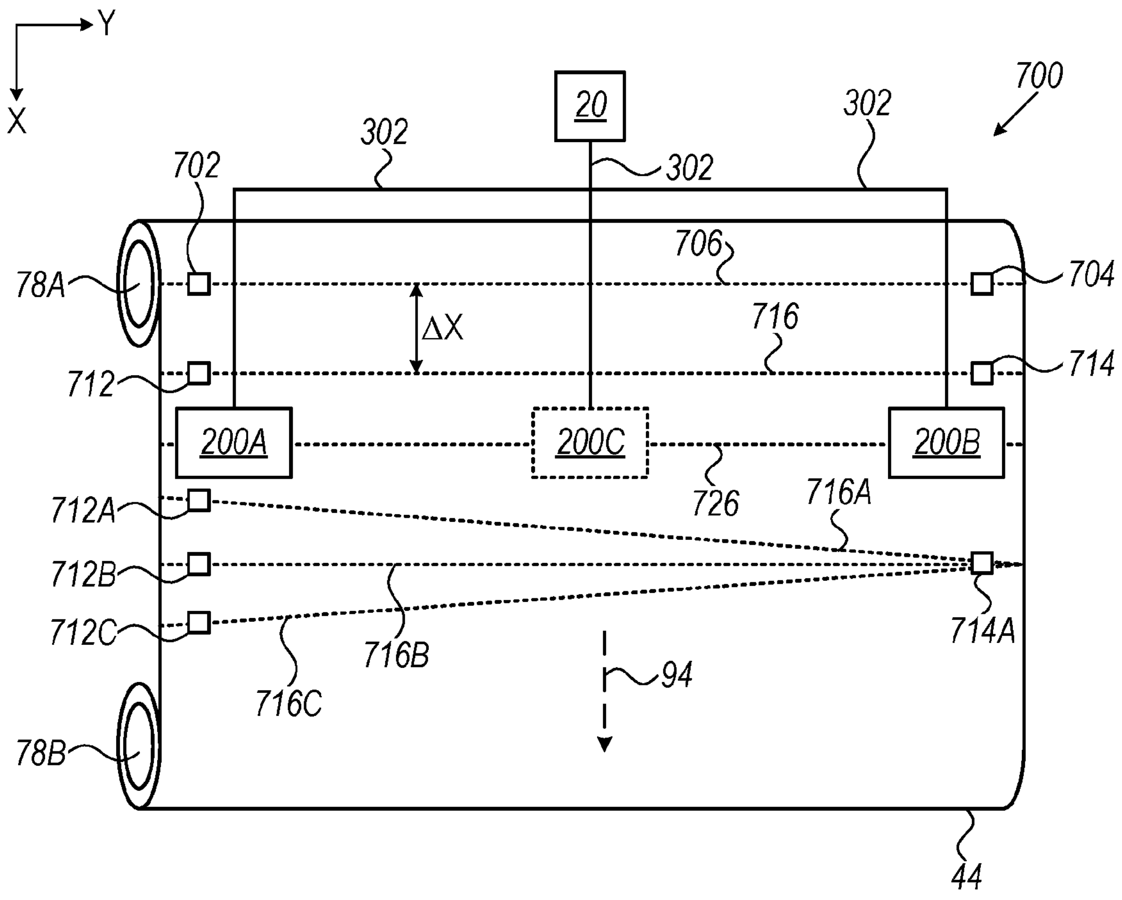
FIG. 8 is a schematic, pictorial illustration of a sub-system for monitoring the position and alignment of moving blanket, in accordance with an embodiment of the present invention.

FIG. 8 is a schematic, pictorial illustration of a sub-system 700 for monitoring the position and alignment of moving blanket 44, in accordance with an embodiment of the present invention. Sub-system 700 is configured to monitor the motion and alignment of blanket 44 during a printing process, a test run, blanket treatment, or during any other moving procedure of blanket 44.

In some embodiments, sub-system 700 may comprise two or more position sensing assemblies 200 described in detail in FIG. 3 above, and/or PCA 300 described in FIG. 4 above. In the present example, sub-system 700 comprises position sensing assemblies 200A and 200B, mounted on sub-system 700 adjacent to respective edges of blanket 44 extended along X-axis (e.g., between about 5 mm and 100 mm from the respective closest edges of blanket 44, note that this range may comprise the ordered structure of blanket fabrics 100, and excludes other features of blanket 44, such as a zipper, or printing fluids that may obstruct the ordered structure of blanket fabrics 100), and between rollers 78A and 78B.

As shown in FIG. 8, sub-system 700 may comprise one or more additional position sensing assemblies, such as position sensing assembly 200C located in close proximity to the center of blanket 44, but position sensing assemblies 200A and 200B are sufficient.

In some embodiments, position sensing assemblies 200A, 200B and 200C are all positioned along a virtual line, referred to herein as an axis 726, which is orthogonal to the moving direction of blanket 44, represented by arrow 94, and are parallel to fibers 104 shown, for example, in FIGS. 2A and 2B above.

In other embodiments, at least one of position sensing assemblies 200A and 200B is positioned adjacent (e.g., within the aforementioned range) to the edge of blanket 44 and the other position sensing assembly may be disposed at any suitable position along axis 726, which is not within the aforementioned range from the closest edge of blanket 44. For example, sub-system 700 may comprise position sensing assemblies 200A and 200C, wherein position sensing assembly 200A is disposed within 50 cm from the closest edge of blanket 44.

In some embodiments, sub-system 700 further comprises processor 20, which is configured to receive, from position sensing assemblies 200A, 200B and 200C via cables 302, signals indicative of the periodic pattern of blanket 44 as described, for example, in FIG. 3 above. In principle, when blanket 44 crosses axis 726, fibers 104 are supposed to be aligned with axis 726. As shown in FIG. 8, when blanket 44 is moved along an X-axis of system 10 (e.g., in the moving direction represented by arrow 94) in a predefined distance $\Delta X$, points 702 and 704, which are positioned on another virtual line, referred to herein as an axis 706 of blanket 44, are supposed to move, respectively, to points 712 and 714 positioned on a different virtual line, referred to herein as an axis 716 of blanket 44. In other words, axes 706 and 716 are parallel to one another. Therefore, a rotary encoder (not shown) may be coupled, for example, to roller 78A for monitoring the position of blanket 44 as a function of a rotation angle of the encoder.

However, due to one or more possible malfunctions of system 10, such as different friction between blanket 44 and blanket module 70 at points 702 and 704, or nonlinear or irregular rotational motion of rollers 78A and 78B, or for any other reason, the distance $\Delta X$ may not be equal across Y-axis. For example, an axis 716A of blanket 44 illustrates a situation where point 702 moves slower than point 704.

In this example, a point 712A, which is indicative of the position of shifted point 702, is moved along X-axis a shorter distance compared to a point 714A, which is indicative of the position of shifted point 704. Similarly, an axis 716C of blanket 44, having points 712C and 714A is not parallel to axis 706, because point 712A, which is indicative of the position of shifted point 702, is moved along X-axis a larger distance compared to point 714A. As a reference for demonstrating the technical problem described above, when points 702 and 704 are moving equal distance along X-axis, both will be positioned, as points 712B and 714A on an axis 716B of blanket 44, which is parallel to axis 706.

The different moving speed of points 702 and 704 and other points along axis 706 may cause a distortion in an image applied to blanket 44, for example, a wave distortion. The phenomena of wave distortion may be caused by various errors, such as deviation from the specified motion profile of blanket 44 as described above, and by other reasons, such as but not limited to (i) erroneous positioning of one or more print bars 62 in image forming station 60, and (ii) deviation from the specified relative velocity between blanket 44 and sheet 50 at impression station 84.

The distortions described above, and additional errors, may result in a wavy pattern of the printed features. Note that typically the wavy pattern has two components: (i) a common wave of all colors, e.g., due to the aforementioned deviation at impression station 84, and (ii) different waves formed in each color image are caused, for example, by the erroneous positioning of one or more print bars 62 and/or due to temporary variation in the velocity of blanket 44, as shown in FIG. 8 and described above. In general, the wave distortion has two components, distortion along X axis that changes with the position on Y axis, referred to herein as wave X(Y), and distortion along Y axis that changes with the position on X axis, referred to herein as wave Y(X). The wave distortions and methods for correcting thereof are described in detail, for example, in PCT Patent Application PCT/IB2019/056746, and in U.S. Patent Application Publication 2019/0152218, whose disclosures are all incorporated herein by reference.

In some embodiments, processor 20 is configured to receive signals from at least two position sensing assemblies 200 mounted in close proximity to blanket 44, such as along axis 726 or in any other suitable configuration. In the present example, processor 20 may receive the signals from position sensing assemblies 200A and 200B, and optionally from additional position sensing assemblies, such as position sensing assembly 200C.

In some embodiments, processor 20 is configured to: (i) identify and map a potential distortion, such as but not limited to the distortion produced along axis 716A, as described above, and (ii) apply any suitable method for correcting the distortion. For example, using one or more of the techniques described in the aforementioned PCT Patent Application PCT/IB2019/056746, and in U.S. Patent Application Publication 2019/0152218. Additionally or alternatively, processor 20 may use any other suitable technique to compensate for the mapped distortion.

This particular configuration of sub-system 700 is shown by way of example, in order to illustrate certain problems that are addressed by embodiments of the present invention and to demonstrate the application of these embodiments in enhancing the performance of system 10. Embodiments of the present invention, however, are by no means limited to this specific sort of example sub-system, and the principles described herein may similarly be applied to other sorts distortion detection, mapping and correction used in any sort of other suitable digital printing systems.

Although the embodiments described herein mainly address controlling, monitoring and calibration of digital printing systems and in monitoring the condition of the flexible ITM and detecting and correcting distortion of images applied to the ITM, the methods and systems described herein can also be used in other applications, such as in controlling direct printing on a flexible target substrate, and monitoring various parameters related to the functionality of the flexible substrate.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A digital printing system, comprising:

a flexible substrate configured to be moved and to receive ink droplets in a printing process that forms an image thereon, the flexible substrate comprising: (i) a fabric having first and second sets of fibers interleaved with one another in accordance with a periodic pattern and a first elongation obtained when applying a given tension to the moving flexible substrate, and (ii) a seam for coupling between edges of the fabric, wherein the seam has a structure other than the periodic pattern, wherein, when applying the given tension to the moving flexible substrate, the seam has a second elongation different from the first elongation;

an optical assembly, which is configured to illuminate the flexible substrate with light, to detect the light from the flexible substrate and to derive from the detected light a signal indicative of the periodic pattern from the interleaved first and second sets of fibers; and a processor, which is configured to receive the signal and to: (i) calculate a ratio between the first and second elongations based on the signal, and (ii) monitor or control the digital printing system based on the periodic pattern as indicated by the signal.

2. The system according to claim 1, wherein the flexible substrate comprises a flexible intermediate transfer member (ITM), which is configured to receive the ink droplets and to transfer the image to a target substrate.

3. The system according to claim 1, wherein the first and second sets of fibers are laid out orthogonally to one another in accordance with the periodic pattern, and wherein the optical assembly is configured to derive the signal indicative of the periodic pattern from the orthogonal layout of the first and second sets of fibers.

4. The system according to claim 1, wherein the first set of fibers is laid out orthogonally to a movement axis of the flexible substrate in accordance with the periodic pattern, and wherein the optical assembly is configured to derive the signal indicative of the periodic pattern from the first set of fibers.

5. The system according to claim 1, wherein, based on the first and second sets of fibers, the optical assembly is configured to detect multiple position reference points in the periodic pattern of the fabric, and wherein the processor is configured to calculate a position of the flexible substrate based on at least one of the position reference points.

6. The system according to claim 5, wherein the signal is indicative of a position of at least one of the position reference points, and wherein the processor is configured to control the digital printing system based on one or more of the position reference points.

7. The system according to claim 1, and comprising an image forming station, which is configured to direct a first ink droplet to a first ink position on the flexible substrate and a second ink droplet to a second ink position on the flexible substrate, wherein the signal comprises a first signal indicative of the first ink position and a second signal indicative of the second ink position, and wherein the processor is configured to control a registration between the first and second ink positions based on the first and second signals.

8. The system according to claim 1, wherein the processor is configured to control the digital printing system based on the calculated ratio between the first and second elongations.

9. The system according to claim 1, wherein the flexible substrate comprises a continuous loop configured to be moved, within the digital printing system, in at least first and second revolutions, and wherein the processor is configured to calculate at least: (i) a first ratio, between the first and second elongations, per the first revolution, and (ii) a second ratio, between the first and second elongations, per the second revolution, and wherein the processor is configured to monitor or control the digital printing system based on at least the first ratio and the second ratio.

10. A method for controlling a digital printing system, the method comprising:

illuminating with light a movable flexible substrate that receives ink droplets in a printing process that forms an image thereon, the movable flexible substrate comprising: (i) a fabric having first and second sets of fibers interleaved with one another in accordance with a periodic pattern and a first elongation obtained when applying a given tension to the moving flexible substrate, and (ii) a seam for coupling between edges of the fabric, wherein the seam has a structure other than the periodic pattern, wherein, when applying the given tension to the moving flexible substrate, the seam has a second elongation different from the first elongation;

detecting the light from the flexible substrate and deriving from the detected light a signal indicative of the periodic pattern from the interleaved first and second sets of fibers;

calculating a ratio between the first and second elongations based on the signal; and monitoring or controlling the digital printing system based on the periodic pattern as indicated by the signal.

11. The method according to claim 10, wherein the flexible substrate comprises a flexible intermediate transfer member (ITM) for receiving the ink droplets and for transferring the image to a target substrate.

12. The method according to claim 10, wherein the first and second sets of fibers are laid out orthogonally to one another in accordance with the periodic pattern, and wherein deriving the signal indicative of the periodic pattern is based on the orthogonal layout of the first and second sets of fibers.

13. The method according to claim 10, wherein the first set of fibers is laid out orthogonally to a movement axis of the flexible substrate in accordance with the periodic pattern, and wherein deriving the signal indicative of the periodic pattern comprises deriving the signal from the layout of first set of fibers.

14. The method according to claim 10, wherein detecting the light comprises detecting, based on the first and second sets of fibers, multiple position reference points in the periodic pattern of the fabric, and comprising calculating a position of the flexible substrate based on at least one of the position reference points.

15. The method according to claim 14, wherein the signal is indicative of a position of at least one of the position reference points, and wherein controlling the digital printing system is based on one or more of the position reference points.

16. The method according to claim 10, and comprising directing a first ink droplet to a first ink position on the flexible substrate and a second ink droplet to a second ink position on the flexible substrate, wherein deriving the signal comprises deriving a first signal indicative of the first ink position and deriving a second signal indicative of the second ink position, and comprising controlling a registration between the first and second ink positions based on the first and second signals.

17. The method according to claim 10, wherein controlling the digital printing system is based on the calculated ratio between the first and second elongations.

18. The method according to claim 10, wherein the flexible substrate comprises a continuous loop configured to be moved, within the digital printing system, in at least first and second revolutions, and wherein calculating the ratio comprises calculating at least: (i) a first ratio, between the first and second elongations, per the first revolution, and (ii) a second ratio, between the first and second elongations, per the second revolution, and wherein monitoring or controlling the digital printing system is based on at least the first ratio and the second ratio.

* * * * *